(12) United States Patent
Sandberg et al.

(10) Patent No.: US 12,483,488 B2
(45) Date of Patent: Nov. 25, 2025

(54) TRAFFIC FLOW PREDICTION IN A WIRELESS NETWORK USING HEAVY-HITTER ENCODING AND MACHINE LEARNING

(71) Applicant: Telefonaktiebolaget LM Ericsson (publ), Stockholm (SE)

(72) Inventors: David Sandberg, Sundbyberg (SE); Pontus Arvidson, Sollentuna (SE); Agnes Rensfelt, Bromma (SE); Henrik Rydén, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 439 days.

(21) Appl. No.: 17/927,380

(22) PCT Filed: May 27, 2020

(86) PCT No.: PCT/SE2020/050538
§ 371 (c)(1),
(2) Date: Nov. 23, 2022

(87) PCT Pub. No.: WO2021/242151
PCT Pub. Date: Dec. 2, 2021

(65) Prior Publication Data
US 2023/0217308 A1 Jul. 6, 2023

(51) Int. Cl.
*H04L 12/00* (2006.01)
*G06N 3/0442* (2023.01)
(Continued)

(52) U.S. Cl.
CPC ......... *H04L 43/028* (2013.01); *G06N 3/0442* (2023.01); *G06N 3/08* (2013.01); *H04L 41/16* (2013.01); *H04W 28/10* (2013.01)

(58) Field of Classification Search
CPC ........ G06N 3/044; G06N 3/045; G06N 3/084; G06N 7/01; H04L 41/142
(Continued)

(56) References Cited

U.S. PATENT DOCUMENTS 10,693,575 B2 * 6/2020 Jana .................. H04B 17/3913
10,887,122 B1 * 1/2021 Nagarajan ............... H04L 47/24
(Continued)

FOREIGN PATENT DOCUMENTS

| CN | 105206047 B | * | 8/2017 | ........... G08G 1/0112 |
|----|-------------|---|--------|------------------------|
| WO | 2016060751 A1 | | 4/2016 | |

(Continued)

OTHER PUBLICATIONS

Guo et al. Cross-domain Data And Against Loss Based City-scale Wireless Traffic Flow Predicting Method, Involves Setting Circulation Times, And Ending Circulation To Finish Joint Training When Set Circulation Times Are Reached, 2020, 2 pages (Year: 2020).*

(Continued)

*Primary Examiner* — Frantz Coby
(74) *Attorney, Agent, or Firm* — Sage Patent Group

(57) ABSTRACT

Systems and methods related to traffic flow prediction in a wireless network are disclosed. In one embodiment, a computer-implemented method comprises collecting training data comprising Internet Protocol (IP) addresses extracted from packets for traffic flows in a wireless network and one or more actual traffic type related parameters for each of the traffic flows. The method further comprises training heavy-hitter IP address encodings based on the extracted IP addresses and encoding the extracted IP addresses using the trained heavy-hitter IP address encodings. The method further comprises training a traffic type predictor of a traffic flow predictor based on the encoded IP addresses and the (Continued)

one or more actual traffic type related parameters for each of the traffic flows, where the traffic type predictor is a learning model that maps encoded IP addresses to one or more predicted traffic type related parameters.

20 Claims, 8 Drawing Sheets

(51) Int. Cl.
  *G06N 3/08* (2023.01)
  *H04L 41/16* (2022.01)
  *H04L 43/028* (2022.01)
  *H04W 28/10* (2009.01)
(58) Field of Classification Search
  USPC .......................................................... 370/235
  See application file for complete search history.

(56) References Cited

U.S. PATENT DOCUMENTS

| | | | |
|---|---|---|---|
| 11,665,576 B2* | 5/2023 | Prasad | H04N 21/238 370/235 |
| 2014/0344651 A1* | 11/2014 | Shastry | H03M 13/353 714/781 |
| 2020/0053591 A1* | 2/2020 | Prasad | H04W 28/0268 |
| 2020/0076520 A1* | 3/2020 | Jana | H04B 17/327 |
| 2021/0233391 A1* | 7/2021 | Xu | G01C 21/3691 |
| 2021/0345134 A1* | 11/2021 | Ottersten | H04W 16/22 |
| 2023/0217308 A1* | 7/2023 | Sandberg | G06N 3/0442 370/235 |
| 2025/0016107 A1* | 1/2025 | Madanapalli | G06F 18/21 |

FOREIGN PATENT DOCUMENTS

| | | | | |
|---|---|---|---|---|
| WO | 2017084723 A1 | 5/2017 | | |
| WO | 2019125250 A1 | 6/2019 | | |
| WO | 2020078246 A1 | 4/2020 | | |
| WO | WO-2020080989 A1 * | 4/2020 | ............. | G06N 3/006 |
| WO | WO-2021242151 A1 * | 12/2021 | ............... | G06N 7/01 |

OTHER PUBLICATIONS

Alawe, et al., "Improving Traffic forecasting for 5G core network scalability: A Machine Learning approach," IEEE Network, vol. 32, Issue 6, Nov. 2018, 10 pages.

Azari, et al., "Cellular Traffic Prediction and Classification: a comparative evaluation of LSTM and ARIMA," Lecture Notes in Computer Science, vol. 11828, Jun. 2019, 16 pages.

Basat, et al., "Designing Heavy-Hitter Detection Algorithms for Programmable Switches," IEEE/ACM Transactions on Networking, vol. 28, Issue 3, Apr. 2020, 14 pages.

Duque-Torres, et al., "An Approach Based on Knowledge-Defined Networking for Identifying Heaver-Hitter Flows In Data Center Networks," Applied Sciences, vol. 9, Issue 22, Nov. 2019, 19 pages.

Guo, et al., "Entity Embeddings of Categorical Variables," Computer Science, Apr. 2016, ArXiv, 9 pages.

Hsu, et al., "Learning-Based Frequency Estimation Algorithms," 7th International Conference on Learning Representations, May 6-9, 2019, 20 pages.

Ring, et al., "IP2Vec: Learning Similarities between IP Addresses," International Conference on Data Mining Workshops, 2017, IEEE Computer Society, pp. 657-666.

Shaikh, et al., "An Overview of Network Traffic Classification Methods," International Journal on Recent and Innovation Trends in Computing and Communication, vol. 3, Issue 2, Feb. 2015, pp. 482-488.

International Search Report and Written Opinion for International Patent Application No. PCT/SE2020/050538, mailed Mar. 31, 2021, 12 pages.

Extended European Search Report for European Patent Application No. 20937721.7, mailed Jun. 22, 2023, 14 pages.

* cited by examiner

TRAFFIC FLOW PREDICTION IN A WIRELESS NETWORK USING HEAVY-HITTER ENCODING AND MACHINE LEARNING

This application is a 35 U.S.C. § 371 national phase filing of International Application No. PCT/SE2020/050538, filed May 27, 2020, the disclosure of which is incorporated herein by reference in its entirety.

TECHNICAL FIELD

The present disclosure relates to traffic prediction in a wireless network such as, for example, a Radio Access Network (RAN) of a cellular communications system.

BACKGROUND

The problem of traffic flow prediction in a wireless network is to predict some aspects of a radio flow such as, for example, the total size of the radio flow, the time the radio flow is expected to be active, the number of packets to be transmitted over the radio flow, or even the size and arrival times of individual packets. This is an important problem since, for example, many features in a modern wireless network require some kind of procedure to enable the feature before any gain can be observed. This procedure often takes time and has associated radio resource overhead. Therefore, it is desirable that the network only enables the feature for User Equipments (UEs) that are expected to gain from the feature.

One common approach to traffic flow prediction is to use historic packet sizes and inter-arrival times to predict future ones. The prediction could be based on the history of data transmissions/receptions of the UE by using, for example, any of the following inputs:
  packet inter-arrival time (standard deviation, average, etc.),
  number of packets in the uplink/downlink,
  total bytes transmitted in the uplink/downlink,
  packet sizes of packets,
  time since last packet,
  packet protocols (Hypertext Transfer Protocol (HTTP), voice, etc.), and
  UE manufacturer.

It is important to note that most features used for traffic flow prediction require an observation time. For example, the network needs to observe the packets during some time T in order to make predictions on the traffic flow for time t>T. In A. Azari et al., "Cellular Traffic Prediction and Classification: A Comparative Evaluation of LSTM and ARIMA," Jun. 3, 2019, a couple of algorithms belonging to this category are evaluated.

Some example use cases where traffic flow prediction can be useful are for the features of carrier aggregation, inter-frequency handover, uplink pre-scheduling, and admission control. In this regard, carrier aggregation can benefit from fast and accurate traffic flow prediction. With carrier aggregation, a UE can be configured with an additional carrier and can therefore use significantly larger bandwidth when required. Once configured, this larger bandwidth typically provides a significant improvement to throughput performance. However, reconfiguring the UE to use the additional carrier requires Radio Resource Control (RRC) signaling that takes time and costs radio resources. So, it is preferable if the amount of data in the UE buffer is relatively large.

Traffic flow prediction can also be advantageous in the case of inter-frequency handover. Typically, when a UE enters the wireless network, the UE connects to the cell with the best signal strength. Since propagation conditions are likely to be more advantageous on lower carrier frequencies, these cells typically end up having higher load. To move UEs from a low carrier frequency to a high carrier frequency requires a handover, which in turn introduces additional latency and consumes radio resources. Just as with carrier aggregation, it is advantageous to only move UEs that are likely to have a lot of data to receive and/or transmit.

Uplink pre-scheduling can also benefit from traffic flow prediction. When data arrives in the uplink UE buffer, the UE needs to request uplink resources in order to transmit the data. This is done using a scheduling request, where the UE transmits a one-bit indicator on either the random access channel or a dedicated uplink control channel. This notifies the base station of the uplink data and causes it to schedule an uplink transmission. If new data arriving in the UE buffer can be anticipated in terms of its approximate size and timing, the base station can issue proactive uplink grants.

Admission control is yet another example of a feature that can benefit from traffic flow prediction. When a UE attempts to connect to the wireless network or is handed over from an adjacent cell, the base station makes a decision to either serve the UE or not. This decision is typically based on measurements of the current cell load as well as the UE's channel quality. If the UE is handed over from an adjacent cell, the type of traffic that the UE has is likely well known and with a relatively long duration. In this case, traditional flow predictors based on packet statistics are likely to work well. In the case of a new UE connecting to the network, much less is known about the UE's traffic, and the base station cannot make a well-informed decision on whether to serve the UE or not. Admission control may also be applied to setting up of new radio bearers, and then typically uses the Guaranteed Bitrate (GBR), as specified by the Third Generation Partnership Project (3GPP), as the basis for the decision. The GBR is a rather blunt estimate, and the admission decision could benefit greatly from a better estimate of the traffic on the bearer that is to be set up.

One aspect of traffic flow prediction is traffic flow classification. There are several approaches to traffic flow classification, namely, port-based, payload-based, and flow statistics-based. An overview of some methods for traffic flow classification can be found in Z. Shaikh et. al., "An Overview of Network Traffic Classification Methods," *International Journal on Recent and Innovation Trends in Computing and Communication*, Volume 3, Issue 2, February 2015, pp. 482-488.

Port-based methods make use of port information for service identification. These methods are not reliable as many services do not use well-known ports or even use the ports used by other applications. Payload-based approaches address the problem by Deep Packet Inspection (DPI) of the payload carried out by the communication flow. These methods look for well-known patterns inside the packets. They currently provide the best possible detection rates but with some associated costs and difficulties, namely, the cost of relying on an up-to-date database of patterns which has to be maintained and the difficulty to be able to access the raw payload. Currently, an increasing proportion of transmitted data is being encrypted or needs to assure user privacy policies, which is a real problem to payload-based methods. Finally, flow statistics-based methods rely on information that can be obtained from packet headers (e.g., bytes transmitted, packet inter-arrival times, Transmission Control Protocol (TCP) window size, etc.). They rely on high-level information in the packet header, which makes them a better option to deal with non-available payloads or dynamic ports.

To enable differentiated handling of multiple traffic types, Long Term Evolution (LTE) and New Radio (NR) implement a Quality of Service (QoS) framework. In LTE, each dedicated bearer is characterized by a Traffic Flow Template (TFT) with QoS parameters associated to it. An uplink TFT is used to map the UE uplink Service Data Flow (SDF) to specific QoS parameters, with the mapping carried out at both the enhanced or evolved Node B (eNB) and the UE. Mapping for the downlink TFT is carried out at, e.g., the Serving Gateway (S-GW). LTE groups bearers into classes. Each class is identified by a scalar number called the QoS Class Identifier (QCI). A QCI identifies a group of QoS parameters describing the packet forwarding treatment in terms of priority, tolerated delay, and packet error rate. Packet forwarding treatment is enforced by allocating radio resources for bearers through scheduling.

The packet filters installed in the TFT filter packets use a set of packet filter parameters. These packet filter parameters include:
  Packet Filter Direction: the direction of the traffic, i.e. uplink only, downlink only, bidirectional
  Packet Filter Identifier: the unique number to identify the packet filter
  Packet Filter Evaluation Precedence: the precedence for the packet filter among all the packet filters in all TFTs associated with the Packet Data Protocol (PDP) address
  Packet Filter Contents: variable components with variable size such as remote/local Internet Protocol (IP) version 4 (IPv4)/IP version 6 (IPv6) address, protocol identifier, remote/local port, etc.

The existing solutions for traffic flow prediction suffer from several problems. First, as mentioned above, a common approach to traffic flow prediction is to record the arrival of packets (arrival time and packet size) for some warm-up period before predictions are generated. This approach works reasonably well for longer flows (i.e., flows with many packets that stretch over a longer time), but since most flows in modern radio networks are very small (both when it comes to the duration but also the traffic volume), the flow can be over before the warm-up period is over. As such, this approach is not suitable for modern radio networks.

Another problem is that the input parameters used by conventional traffic flow prediction schemes is limited and does not result in accurate predictions under certain conditions.

Yet another problem is that the packet filters used for QoS differentiations described above use IP addresses and ports to, for example, map Voice over IP (VoIP) traffic on a different bearer than best effort traffic such as, e.g., web browsing traffic. However, maintaining this mapping requires a lot of manual work and is therefore expensive to maintain.

SUMMARY

Systems and methods related to traffic flow prediction in a wireless network are disclosed. In one embodiment, a computer-implemented method for traffic flow prediction for a wireless network comprises collecting training data comprising Internet Protocol (IP) addresses or parts of IP addresses extracted from IP headers of packets for traffic flows in a wireless network and one or more actual traffic type related parameters for each of the traffic flows. The method further comprises training heavy-hitter IP address encodings based on the IP addresses or the parts of IP addresses extracted from the IP headers of the packets for the traffic flows in the wireless network and encoding the IP addresses or the parts of IP addresses extracted from the IP headers of the packets for the traffic flows using the trained heavy-hitter IP address encodings to thereby provide encoded IP addresses. The method further comprises training a traffic type predictor of a traffic flow predictor based on the encoded IP addresses and the one or more actual traffic type related parameters for each of the traffic flows, where the traffic type predictor is a learning model that maps encoded IP addresses to one or more predicted traffic type related parameters. In this manner, a traffic type predictor is trained that can be used to quickly and efficiently predict traffic type related parameters for a traffic flow in the wireless network. The traffic type related parameters may then be used in the wireless network to perform one or more tasks such as, for example, making a decision to activate carrier aggregation for the traffic flow.

In one embodiment, the IP addresses or the parts of IP addresses are source IP addresses or parts of source IP addresses for downlink packets and destination IP addresses or parts of destination IP addresses for uplink packets.

In one embodiment, the one or more actual traffic type related parameters comprise, for each traffic flow, an actual duration of the traffic flow. Further, the one or more predicted traffic type related parameters comprise a predicted duration of a respective traffic flow for which prediction is performed.

In one embodiment, the training data comprises the IP addresses extracted from IP headers of the plurality of packets for the plurality of traffic flows in the wireless network, training the heavy-hitter encodings comprises training the heavy-hitter encodings based on the IP addresses extracted from IP headers of the plurality of packets for the plurality of traffic flows in the wireless network, and encoding the IP addresses or the parts of IP addresses comprises encoding the IP addresses extracted from IP headers of the plurality of packets for the plurality of traffic flows in the wireless network based on the heavy-hitter encodings.

In one embodiment, the heavy-hitter IP address encodings comprise mappings of heavy-hitter IP addresses to respective one-hot encodings, wherein each heavy-hitter IP address is an IP address that occurs at least a predefined or preconfigured amount of times in the training data and each one-hot encoding is a mapping of a respective heavy-hitter IP address to a particular one-hot value, the one-hot value being a bit sequence in which only one bit is set to a first binary value and all other bits in the bit sequence are set to a second binary value that is different than the first binary value.

In one embodiment, the heavy-hitter IP address encodings comprise mappings of heavy-hitter IP address ranges to respective one-hot encodings, wherein each heavy-hitter IP address range of the plurality of heavy-hitter IP address ranges is an IP address range for which IP addresses that match the IP address range occur at least a predefined or preconfigured amount of times in the training data.

In one embodiment, the training data further comprises port numbers extracted from Transmission Control Protocol (TCP) or User Datagram Protocol (UDP) headers of the packets for the traffic flows in the wireless network, and the method further comprises training heavy-hitter port number encodings based on the port numbers extracted from the TCP or UDP headers of the packets for the traffic flows in the wireless network and encoding the port numbers extracted from the TCP or UDP headers of the packets for the traffic flows using the trained heavy-hitter port number encodings. Further, training the traffic type predictor comprises training the traffic type predictor based on the encoded IP addresses, the encoded port numbers, and the one or more actual traffic type related parameters for each of the traffic flows, wherein the traffic type predictor is a learning model that maps encoded IP addresses and encoded port numbers to one or more predicted traffic type related parameters. In one embodiment, the port numbers are port numbers associated with source IP addresses for downlink packets and port numbers associated with destination IP addresses for uplink packets. In one embodiment, the heavy-hitter port number encodings comprise mappings of heavy-hitter port numbers to respective one-hot encodings, wherein each heavy-hitter port number is a port number that occurs at least a predefined or preconfigured amount of times in the training data. In one embodiment, the heavy-hitter port number encodings comprise mappings of heavy-hitter port number ranges to respective one-hot encodings, wherein each heavy-hitter port number range is a port number range for which port numbers that match the port number range occur at least a predefined or preconfigured amount of times in the training data.

In one embodiment, the training data further comprises one or more link quality related parameters for each of the traffic flows in the wireless network, and training the traffic type predictor comprises training the traffic type predictor based on the encoded IP addresses, the one or more actual traffic type related parameters for each of the traffic flows, and the one or more link quality related parameters for each of the traffic flows in the wireless network, wherein the traffic type predictor is a learning model that maps encoded IP addresses and the one or more link quality related parameters to one or more predicted traffic type related parameters. In one embodiment, the one or more link quality related parameters comprise channel quality, cell load, or both channel quality and cell load.

In one embodiment, the training data further comprises one or more packet related parameters for the packets for the traffic flows in the wireless network, and the method further comprises training a packet predictor of the traffic flow predictor based on, for each traffic flow, an initial context for the traffic flow output by the traffic type predictor and the one or more packet related parameters for the traffic flow from the training data, wherein the packet predictor comprises a sequence model for prediction of one or more parameters for a next packet in the traffic flow based on one or more parameters for a current packet in the traffic flow. In one embodiment, the initial context comprises information that indicates a traffic category of the traffic flow. In one embodiment, the one or more packet related parameters for the packets for the traffic flows comprised in the training data comprise: (a) packet arrival time, (b) packet size, (c) packet direction, or (d) a combination of any two or more of (a)-(c). Further, the sequence mode predicts (i) next packet arrival time for a respective traffic flow, (ii) next packet size for the respective traffic flow, (iii) next packet direction for the respective traffic flow, or (iv) a combination of any two or more of (i)-(iii), based on (A) current arrival time for the respective traffic flow, (B) current packet size for the respective traffic flow, (C) current packet direction for the respective traffic flow, or (D) a combination of any two or more of (A)-(C).

In one embodiment, for at least one predicted traffic type related parameter of the one or more predicted traffic type related parameters, the learning model further outputs one or more values that represent an uncertainty of the at least one predicted traffic type related parameter expressed as a Gaussian mixture.

In one embodiment, the method further comprises providing results of the training of the heavy-hitter IP address encodings and results of the training of the traffic type predictor to one or more other nodes. In one embodiment, the wireless network is a radio access network of a cellular communications system, and the one or more other nodes comprise at least one of a plurality of base stations in the radio access network. In one embodiment, the wireless network is a radio access network of a cellular communications system, and the training data is for a geographical area that is served by a plurality of base stations in the radio access network.

In one embodiment, the method further comprises receiving training results from one or more other processing nodes and combining the received training results with results of the training of the heavy-hitter IP address encodings and results of the training of the traffic type predictor to one or more other nodes.

In one embodiment, the method further comprises repeating the training of the heavy-hitter IP address encodings and the training of the traffic type predictor.

In one embodiment, the method further comprises using the trained heavy-hitter IP address encodings and the trained traffic type predictor to predict one or more traffic type related parameters for one or more current traffic flows in the wireless network. In one embodiment, the one or more traffic type related parameters comprise, for a particular traffic flow, (i) a duration of the particular traffic flow, (ii) a downlink volume of the particular traffic flow, (iii) an uplink volume of the particular traffic flow, or (iv) a combination of any two or more of (i) to (iii). In one embodiment, the method further comprise using, for a particular traffic flow, the one or more traffic type related parameters predicted for the particular traffic flow to perform one or more tasks related to the wireless network. In one embodiment, the one or more tasks comprises deciding whether to activate carrier aggregation for a User Equipment (UE) associated with the particular traffic flow, deciding whether to perform inter-frequency handover for the UE associated with the particular traffic flow, determining whether to perform uplink pre-scheduling for the particular traffic flow, determining an amount of uplink resources and/or a timing of those uplink resources to be prescheduled for the particular traffic flow, and/or performing one or more admission control related actions for the particular traffic flow.

Corresponding embodiments of a processing node are also disclosed. In one embodiment, a processing node for traffic flow prediction for a wireless network is adapted to collect training data comprising IP addresses or parts of IP addresses extracted from IP headers of packets for traffic flows in a wireless network and one or more actual traffic type related parameters for each of the traffic flows. The processing node is further adapted to train heavy-hitter IP address encodings based on the IP addresses or the parts of IP addresses extracted from the IP headers of the packets for the traffic flows in the wireless network and encode the IP addresses or the parts of IP addresses extracted from the IP headers of the packets for the traffic flows using the trained heavy-hitter IP address encodings to thereby provide encoded IP addresses. The processing node is further adapted to train a traffic type predictor of a traffic flow predictor based on the encoded IP addresses and the one or more actual traffic type related parameters for each of the traffic flows, wherein the traffic type predictor is a learning model that maps encoded IP addresses to one or more predicted traffic type related parameters.

In one embodiment, the processing node is a base station of the wireless network, a network node of the wireless network, or a node that is external to the wireless network.

In one embodiment, a processing node for traffic flow prediction for a wireless network comprises processing circuitry configured to cause the processing node to collect training data comprising IP addresses or parts of IP addresses extracted from IP headers of packets for traffic flows in a wireless network and one or more actual traffic type related parameters for each of the traffic flows. The processing circuitry is further configured to cause the processing node to train heavy-hitter IP address encodings based on the IP addresses or the parts of IP addresses extracted from the IP headers of the packets for the traffic flows in the wireless network and encode the IP addresses or the parts of IP addresses extracted from the IP headers of the packets for the traffic flows using the trained heavy-hitter IP address encodings to thereby provide encoded IP addresses. The processing circuitry is further configured to cause the processing node to train a traffic type predictor of a traffic flow predictor based on the encoded IP addresses and the one or more actual traffic type related parameters for each of the traffic flows, wherein the traffic type predictor is a learning model that maps encoded IP addresses to one or more predicted traffic type related parameters.

In one embodiment, a computer-implemented method for traffic flow prediction for a wireless network comprises receiving a packet for a particular traffic flow, extracting an IP address or a part of the IP address from an IP header of the received packet, encoding the extracted IP address or the extracted part of the IP address using a first heavy-hitter encoder that maps the extracted IP address or the extracted part of the IP address to an encoded IP address, and predicting one or more predicted traffic type related parameters for the particular traffic flow based on the encoded IP address.

In one embodiment, the IP address is source IP addresses if the received packet is a downlink packet or a destination IP addresses if the received packet is an uplink packet.

In one embodiment, the one or more predicted traffic type related parameters comprise a predicted duration of the particular traffic flow.

In one embodiment, the first heavy-hitter encoder maps the extracted IP address or the extracted part of the IP address to a respective one-hot value for a respective heavy-hitter IP address or a respective heavy-hitter IP address range, the respective one-hot value is a bit sequence in which only one bit is set to a first binary value and all other bits in the bit sequence are set to a second binary value that is different than the first binary value.

In one embodiment, the method further comprises extracting port number from a TCP or UDP header of the received packet and encoding the extracted port number using a second heavy-hitter encoder that maps the extracted port number to an encoded port number. Further, predicting the one or more predicted traffic type related parameters for the particular traffic flow comprises predicting the one or more predicted traffic type related parameters based on the encoded IP address and the encoded port number. In one embodiment, the extracted port number is a port number associated with a source IP address of the received packet if the received packet is a downlink packet or a port number associated with a destination IP address of the received packet if the received packet is an uplink packet. In one embodiment, the second heavy-hitter encoder maps the extracted port number to a respective one-hot value for a respective heavy-hitter port number or a respective heavy-hitter port number range, the respective one-hot value is a bit sequence in which only one bit is set to a first binary value and all other bits in the bit sequence are set to a second binary value that is different than the first binary value.

In one embodiment, predicting the one or more predicted traffic type related parameters for the particular traffic flow comprises predicting the one or more predicted traffic type related parameters based on the encoded IP address, the encoded port number, and one or more link quality related parameters. In another embodiment, predicting the one or more predicted traffic type related parameters for the particular traffic flow comprises predicting the one or more predicted traffic type related parameters based on the encoded IP address and one or more link quality related parameters. In one embodiment, the one or more link quality related parameters comprise channel quality, cell load, or both channel quality and cell load.

In one embodiment, the method further comprises predicting one or more packet related parameters for a next packet in the particular traffic flow based on one or more packet related parameters for the received packet in the particular traffic flow and an initial context provided as a result of predicting the one or more predicted traffic type related parameters. In one embodiment, the initial context comprises information that indicates a traffic category of the traffic flow. In one embodiment, the one or more packet related parameters for the received packet comprise: (a) a packet arrival time of the received packet, (b) a packet size of the received packet, (c) a packet direction of the received packet, or (d) a combination of any two or more of (a)-(c). Further, the one or more packet related parameters predicted for the next packet comprise: (i) an arrival time of the next packet, (ii) a packet size of the next packet, (iii) a packet direction of the next packet, or (iv) a combination of any two or more of (i)-(iii).

In one embodiment, for at least one predicted traffic type related parameter of the one or more predicted traffic type related parameters, predicting the one or more predicted traffic type related parameters for the particular traffic flow comprises predicting an uncertainty of the at least one predicted traffic type related parameter expressed as a Gaussian mixture.

In one embodiment, the method further comprises performing one or more actions based on the one or more predicted traffic type related parameters. In one embodiment, the one or more actions comprise deciding whether to activate carrier aggregation for a UE associated with the particular traffic flow, deciding whether to perform inter-frequency handover for the UE associated with the particular traffic flow, determining whether to perform uplink pre-scheduling for the particular traffic flow, determining an amount of uplink resources and/or a timing of those uplink resources to be prescheduled for the particular traffic flow, and/or performing one or more admission control related actions for the particular traffic flow.

Corresponding embodiments of a processing node are also disclosed. In one embodiment, a processing node for traffic flow prediction for a wireless network is adapted to receive a packet for a particular traffic flow, extract an IP address or part of the IP address from an IP header of the received packet, encode the extracted IP address or the extracted part of the IP address using a first heavy-hitter encoder that maps the extracted IP address or the extracted part of the IP address to an encoded IP address, and predict one or more predicted traffic type related parameters for the particular traffic flow based on the encoded IP address.

In one embodiment, the processing node is a base station of the wireless network, a network node of the wireless network, or a node that is external to the wireless network.

In one embodiment, a processing node for traffic flow prediction for a wireless network comprises processing circuitry configured to cause the processing node to receive a packet for a particular traffic flow, extract an IP address or a part of the IP address from an IP header of the received packet, encode the extracted IP address or the extracted part of the IP address using a first heavy-hitter encoder that maps the extracted IP address or the extracted part of the IP address to an encoded IP address, and predict one or more predicted traffic type related parameters for the particular traffic flow based on the encoded IP address.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
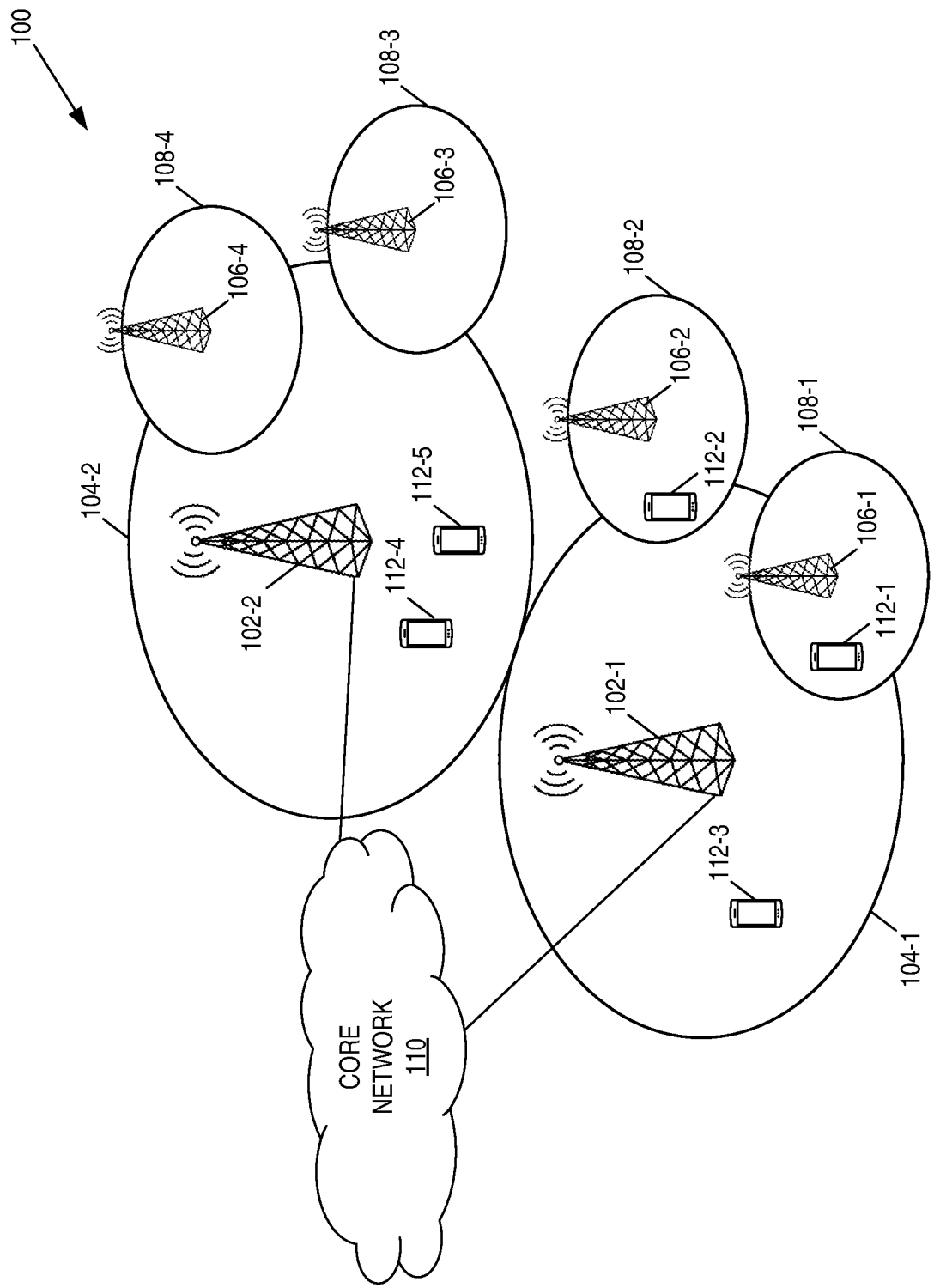
FIG. 1 illustrates one example of a cellular communications network according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Heavy-hitter: The term "heavy-hitter" is a term of art, particularly in the field of data mining, that refers to an item in a dataset that has a frequency of occurrence within the dataset that is greater than a predefined or preconfigured threshold. Heavy-hitters are also referred to as "frequent items" or "top-k" items in the dataset.

Internet Protocol (IP) Address Wildcard: As used herein, an "IP address wildcard" is a beginning part of an IP address that indicates a range of IP addresses. Examples of an IP address wildcard are: 192.168.* (indicates a range of IP addresses from 192.168.0.0 to 192.168.255.255) and 192.168.0.* (indicates a range of IP addresses from 192.168.0.0 to 192.168.0.255). An "IP address wildcard" is thus alternatively referred to herein as an "IP address range".

Heavy-hitter IP Address: As used herein, a "heavy-hitter IP address" is an IP address having a frequency of occurrence in a data set (e.g., training data) that is greater than a predefined or preconfigured threshold.

Heavy-hitter IP Address Wildcard: As used herein, a "heavy-hitter IP address wildcard" is an IP address wildcard (i.e., a part of an IP address) having a frequency of occurrence in a data set (e.g., training data) that is greater than a predefined or preconfigured threshold. In other words, a "heavy-hitter IP address wildcard" is an IP address wildcard (i.e., part of an IP address) for which IP addresses within the corresponding range of IP addresses have a combined frequency of occurrence in a data set (e.g., training data) that is greater than a predefined or preconfigured threshold.

Heavy-hitter IP Address Encoding: As used herein, a "heavy-hitter IP address encoding" is mapping of a heavy-hitter IP address or heavy-hitter IP address wildcard to a particular value. In one embodiment, the particular value is a "one-hot value".

One-Hot Encoding: The term "one-hot encoding" is a term of art in the field of data encoding that refers to a mapping of an input to a bit sequence (referred to as a "one-hot value") having a single "hot" bit and all remaining bits are "non-hot" bits. Generally, the "hot" bit is a bit value of "1" and the "non-hot" bits are all "0". However, the converse may alternatively be used.

Port Number Wildcard: As used herein, a "port number wildcard" is a beginning part of a port number (e.g., a Transmission Control Protocol (TCP) port number or a User Datagram Protocol (UDP) port number). A "port number wildcard" is also referred to herein as a "port number range".

Heavy-hitter Port Number: As used herein, a "heavy-hitter port number" is a port number having a frequency of occurrence in a data set (e.g., training data) that is greater than a predefined or preconfigured threshold.

Heavy-hitter Port Number Wildcard: As used herein, a "heavy-hitter port number wildcard" is a port number wildcard (i.e., beginning part of a port number or value that indicates a range of port numbers) having a frequency of occurrence in a data set (e.g., training data) that is greater than a predefined or preconfigured threshold. In other words, a "heavy-hitter port number wildcard" is a port number wildcard (i.e., beginning part of a port number or value that indicates a range of port numbers) for which port numbers within the corresponding range of port numbers have a combined frequency of occurrence in a data set (e.g., training data) that is greater than a predefined or preconfigured threshold.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Existing traffic flow prediction solutions suffer from a number of problems. As discussed above, a common approach to traffic flow prediction is to record the arrival of packets (arrival time and packet size) for some warm-up period before predictions are generated. This approach works reasonably well for longer flows (i.e., flows with many packets that stretch over a longer time), but it is not suitable for modern RANs (e.g., LTE RAN or NR RAN) where traffic flows may be over before the warm-up period is over.

In addition, if some sort of flow control is used for a traffic flow (e.g., in the case of TCP), the speed of the link will affect the size and rate of the incoming packets. For example, if a user at a UE wants to download a large file, the rate at which downlink packets arrive in the downlink Radio Link Control (RLC) buffer will be slow if the radio link is poor. As such, a conventional traffic flow predictor that is limited to the set of features (i.e., input parameters) outlined in the Background section above can easily confuse the true packet arrival distribution with one caused by flow control. As described herein, channel quality and cell load metrics make it possible for the traffic flow predictor described herein to predict this, i.e. that packets will arrive less frequently if the channel quality is poor.

As also described above, packet filters used for Quality of Service (QoS) differentiations use IP addresses and ports to, for example, map Voice over IP (VoIP) traffic on a different bearer than best effort traffic such as, e.g., web browsing traffic. If similar mappings of IP addresses to flow types could be done for most traffic flows the problem would be solved. However, maintaining this mapping requires a lot of manual work and is therefore expensive to maintain.

Solutions to the aforementioned and other problems associated with existing traffic flow prediction schemes are disclosed herein. In this regard, systems and methods related to traffic flow prediction in a wireless network such as, for example, a RAN of a cellular communications system are disclosed herein. In the embodiments disclosed herein, a model (e.g., a neural network(s)) for traffic flow prediction uses features extracted from IP headers (e.g., server side IP address) and, optionally, TCP/UDP headers (e.g., server side TCP port number) to predict one or more traffic flow statistics (e.g., flow duration, size of the traffic (e.g., uplink volume and/or downlink volume)). In one embodiment, IP addresses (or parts of IP addresses) and, optionally, TCP port numbers are used as categorical inputs and are encoded to get a reasonable number of categories. In one embodiment, a heavy-hitter encoding scheme is used.

In some embodiments, the model for traffic flow prediction also uses one or more link quality related features (e.g., cell load and/or channel quality) to predict packet arrival time and/or packet size. Since the duration of a traffic flow as well as the time between packets belonging to the flow depends on link quality, using the one or more link quality related features as inputs to the model provides more accurate traffic flow predication as compared to the conventional traffic flow prediction solutions.

In some embodiments, the predicted outputs of the model (e.g., the one or more traffic flow statistics and, optionally, packet arrival time and/or packet size) are approximated with Gaussian mixtures. In this manner, the uncertainty of the predictions is also provided by the model.

Embodiments of the solutions described herein provide a number of advantages over existing traffic flow prediction solutions. For example, embodiments of the traffic flow predictor described herein start outputting predictions after receiving the first packet in the traffic flow. This allows fast traffic flow predictions, unlike conventional solutions that base predictions on historical data for the traffic flow. As another example, some embodiments of the solutions described herein output predictions with associated uncertainties expressed as Gaussian mixtures. For example, for server side IP addresses that are very rare, embodiments of the traffic predictor described herein indicate that predictions are uncertain which makes it possible to account for this when making decisions based on the predictions later on.

As another example, embodiments of the solutions described herein provide accurate predictions for common types of traffic (e.g., YouTube traffic, Netflix traffic, Skype traffic, background signaling for common applications, etc.) and less accurate for less frequently used applications. Hence, the efficiency of serving most of the users will increase and radio resources can be spent on serving the less common traffic types. As yet another example, some embodiments of the solutions described herein make predictions jointly for uplink and downlink. Since uplink and downlink traffic are very dependent for many flow types, predictions for downlink can be improved by taking uplink traffic into account.

As another example, some embodiments of the solutions described herein take radio quality and cell load (i.e., congestion) into account. This is important in order to account for, e.g., rate of TCP slow start and similar effects where for example the rate in one link affects that packet distribution in the other link. As another example, embodiments of the present disclosure train the traffic flow predictor using data available in the radio network. This makes the traffic flow predictor autonomous in the sense that it does not require human intervention or hand labelling of, for example, traffic flow classes.

FIG. 1 illustrates one example of a cellular communications system 100 in which embodiments of the present disclosure may be implemented. In the embodiments described herein, the cellular communications system 100 is 5G System (5GS) including a Next Generation RAN (NG-RAN) (also referred to herein as a NR RAN) and a 5G Core (5GC) or a Evolved Packet System (EPS) including an Evolved Universal Terrestrial Radio Access Network (E-UTRAN) (also referred to herein as a LTE RAN) and an Evolved Packet Core (EPC). In this example, the RAN includes base stations 102-1 and 102-2, which in the 5GS include NR base stations (gNBs) and optionally next generation eNBs (ng-eNBs) (i.e., LTE base stations connected to the 5GC) and in the EPS include eNBs), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5GC and in the EPS is referred to as the EPC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Systems and methods are disclosed herein for training and use of a traffic flow predictor for a wireless network such as, e.g., a RAN. In one example embodiment, the traffic flow predictor is implemented in each of the base stations 102 or implemented on some other node(s) in the RAN. In some embodiments, training of the traffic flow predictor is performed offline (e.g., by a computer system based on data obtained from the RAN). In some other embodiments, training of the traffic flow predictor is performed online (e.g., at the base stations 102).

Figure 2:
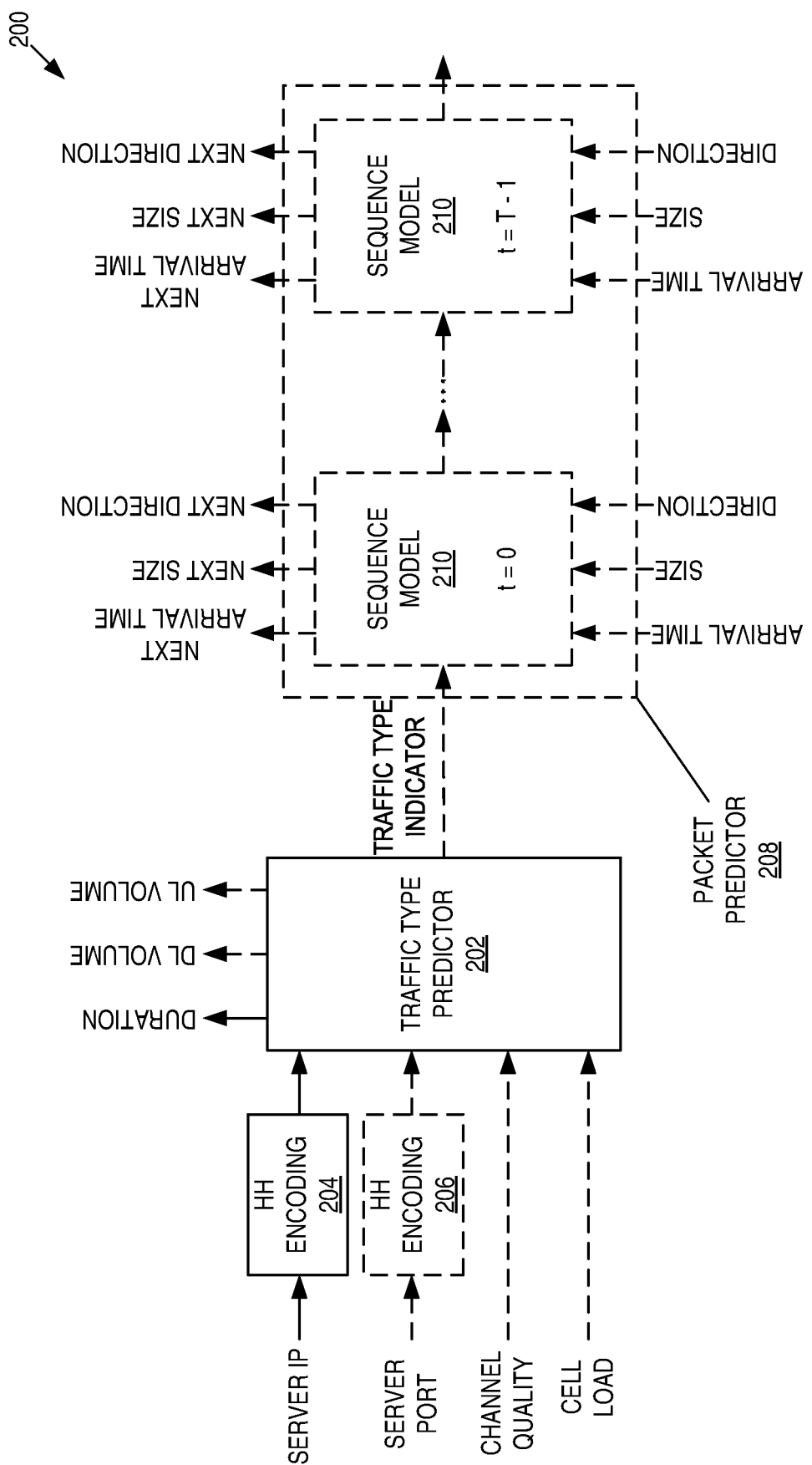
FIG. 2 illustrates one example of a traffic flow predictor in accordance with embodiments of the present disclosure.

FIG. 2 is a block diagram of a traffic flow predictor 200 in accordance with one embodiment of the present disclosure. Optional aspects are represented by dashed lines/boxes. As illustrated, the traffic flow predictor 200 includes a traffic type predictor 202, a first Heavy-Hitter (HH) encoder 204, and optionally a second HH encoder 206. As discussed below, the traffic flow predictor 200 is a neural network or other type of machine learning model that predicts a number of traffic flow parameters (i.e., traffic flow duration and optionally downlink volume of the traffic flow and/or uplink volume of the traffic flow, in this example) based on a number of input parameters (also referred to as "features"). The input parameters include an encoded IP address that represents a traffic category, optionally an encoded port number that represents a traffic class, and optionally one or more link quality related parameters for the traffic flow (e.g., channel quality and/or cell load, in this example). As discussed below, in some embodiments, predicted traffic flow parameter(s) are represented as Gaussian mixtures that indicate both a predicted value and an uncertainty of the predicted value.

The encoded IP address is provided by the first HH encoder 204. While the details of HH encoding are described below, in general, the first HH encoder 204 receives, as an input, an IP address or part of an IP address (e.g., a server IP address or a part of a server IP address) from an IP header of a packet for a traffic flow and outputs an encoded IP address (e.g., a one-hot value) that represents a traffic category to which the first HH encoder 204 maps the IP address. In other words, the first HH encoder 204 maps the IP address or part of the IP address to a traffic category.

Optionally, the encoded port number is provided by the second HH encoder 206. The second HH encoder 206 receives, as an input, a port number (e.g., TCP port number) from a respective header (e.g., TCP/UDP header) of the packet for the traffic flow and outputs an encoded port number (e.g., a one-hot value) that represents a traffic category to which the second HH encoder 206 maps the port number. Thus, the second HH encoder 206 maps the port number to a traffic category. Like the IP address, the port number is, for example, the server port number.

At the traffic type predictor 202, the encoded IP address output by the first HH encoder 204, optionally the encoded port number output by the second HH encoder 206, and optionally the cell load and/or channel quality are received as inputs (also referred to herein as a "features") to a traffic type prediction model that maps the encoded server IP address, optionally the encoded server port number, and optionally cell load and/or channel quality to values for one or more predicted outputs, which in this example include a value(s) that represents a predicted duration of the traffic flow and, optionally, a downlink volume for the traffic flow and/or an uplink volume for the traffic flow.

Optionally, the traffic flow predictor 200 also includes a packet predictor 208 that uses a sequence model 210 to predict a number of packet related parameters for a next packet in the traffic flow (e.g., arrival time for a next packet in the traffic flow, a size (e.g., number of bytes) of the next packet in the traffic flow, and/or a direction (i.e., uplink or downlink) of the next packet in the traffic flow) based on a context, or state, of the traffic type predictor 202 (e.g., values of a set of neural network parameters that define a neural network that serves as the traffic type predictor 202) and a number of packet related parameters for a current packet in the traffic flow (e.g., arrival time for the current packet in the traffic flow, a size of the current packet in the traffic flow, and/or a direction of the current packet in the traffic flow), at each time t=0, 1, . . . , T−1.

First HH Encoder 204

It is desirable to use the IP address (or part of the IP address) of the network side server as a feature in the traffic flow predictor 200. One way to represent categorical features in the input to a machine learning model is to use one-hot encoding. This means that the input is represented as a vector with as many elements as the number of categories. Hence, in order to represent an IP version 6 (IPv6) IP address using a one-hot encoding, a vector of size 2^128 or 3.41098 would be needed. Not only is this infeasible to use as an input feature to a neural network, but the model would also be extremely large and therefore also require massive amounts of data to train.

Two methods to solve the problem of large IP address space have been proposed in M. Ring et al., "IP2Vec: Learning Similarities Between IP Addresses," 2017 IEEE International Conference on Data Mining Workshops (ICDMW), pp. 657-666 and C. Guo et al., "Entity Embeddings of Categorical Variables," Apr. 22, 2016. However, both these methods are similar to word2vec, which is commonly used to encode words to embeddings for natural language processing problems. These two methods try to solve the problem in a similar way by using ideas from natural language processing. Entities (words or IP addresses) in a training set are mapped to an embedding, where entities appearing in similar contexts are mapped to embeddings that are close to each other in Euclidian space. If the number of unique IP addresses in the training set is large, the size of the embedding layer will also be large and can be prohibitively large for practical sizes of the training set. On the other hand, if only a subset of the IP addresses in the training set are mapped to a corresponding embedding, it will not be possible to predict anything for IP addresses that are left without embedding.

Thus, rather than either of the methods for solving the problem of a large IP address space discussed above, the traffic flow predictor 200 uses the first HH encoder 204. Using HH encoding, IP addresses that appear frequently are encoded in a precise way by, in the example embodiment described herein, mapping those IP addresses to their own categories. Conversely, IP addresses that appear less frequently are encoded with a category that aggregates a range of IP addresses. Each category is mapped to its own one-hot encoding that is then fed to the traffic type predictor 202 (as the encoded IP address).

Using the first HH encoder 204, IP addresses that appear seldom (or never) in a dataset are represented with course granularity (i.e., many individual IP addresses are mapped to the same category). Conversely, for frequent IP addresses (i.e., for "heavy-hitters"), there is a one-to-one mapping from the IP address to a respective category.

Figure 3:
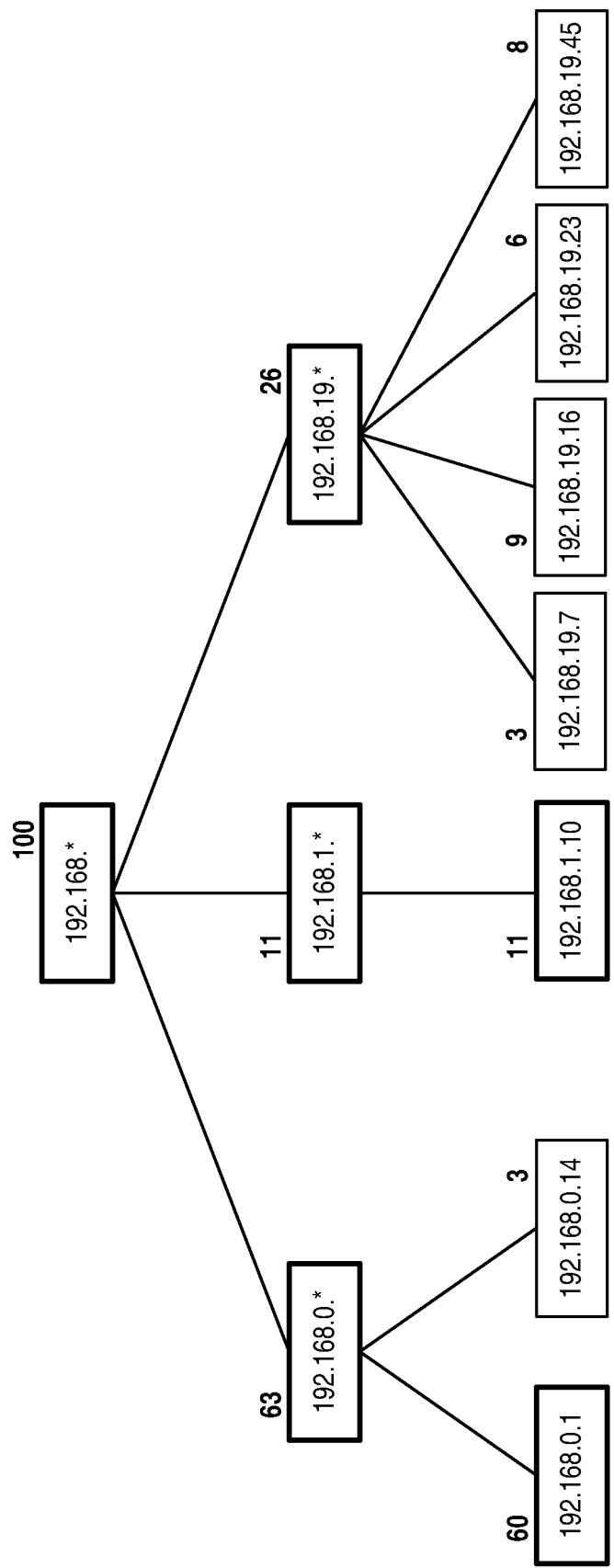
FIG. 3 illustrates one example of identifying heavy-hitter Internet Protocol (IP) addresses in accordance with embodiments of the present disclosure.

Here, heavy-hitter IP addresses are defined as, given a threshold $\varphi$, all IP addresses with frequency in the dataset (i.e., the dataset used for training) of at least $\varphi N$. This classification is performed on all levels in an IP address tree that defines the IP address space (e.g., the IP version 4 (IPv4) IP address space), i.e. for the leaf nodes as well as for their ancestors. This is exemplified in FIG. 3. In the example of FIG. 3, there is a dataset of N=100 entries containing IP addresses. A hyper parameter $\varphi=0.1$ (i.e., 10%) controls the relative amount of matches that an IP address needs to get classified as a heavy-hitter. Note that the value of $\varphi=0.1$ is only an example. In a practical scenario, the number of entries in the dataset would typically be much larger and the hyper parameter $\varphi$ would need to be selected to give a reasonable number of categories. A reasonable number of categories would be in the order of, for example, 1,000 to 100,000 categories. In the example of FIG. 3, the IP addresses (including IP address wildcards (e.g., 192.168.*) that are classified as heavy-hitters) are represented by bolded frames.

In Table 1 below, the heavy-hitters in the example of FIG. 3 are mapped to categories.

TABLE 1

Mapping of heavy-hitters to categories and corresponding one-hot encodings

| Heavy-hitter | Category | One-hot encoding |
| --- | --- | --- |
| 192.168.* | 0 | 000001 |
| 192.168.0.* | 1 | 000010 |
| 192.168.0.1 | 2 | 000100 |
| 192.168.1.* | 3 | 001000 |
| 192.168.1.10 | 4 | 010000 |
| 192.169.19.* | 5 | 100000 |

To further clarify how this mapping would be used in practice, some examples of IP addresses of packets received during the execution phase of the traffic flow predictor 200 (i.e., with IP addresses that are not necessarily in the training data) and how these IP addresses can be encoded by the first HH encoder 204 using the example heavy-hitter mapping of Table 1 are shown below in Table 2.

TABLE 2

Examples of how IP addresses in the test set can be encoded

| IP address | Heavy-hitter | Category | One-hot encoding |
| --- | --- | --- | --- |
| 192.168.0.1 | 192.168.0.1 | 2 | 000100 |
| 192.168.19.7 | 192.168.19.* | 5 | 100000 |
| 192.168.3.17 | 192.168.* | 0 | 000001 |
| 192.168.1.10 | 192.168.1.10 | 4 | 010000 |
| 192.168.1.11 | 192.168.1.* | 3 | 001000 |

It should be noted that in the above example IPv4 addresses have been used. As the use of IPv6 addresses become more widespread, it would make sense to handle these by the same traffic flow predictor. This can be done by, for example, translating IPv4 addresses to their IPv6 counterpart before encoding them using the first HH encoder 204.

It should also be noted that while much of the description provided herein refers to full IP addresses being used as inputs to the first HH encoder 204, the present disclosure is not limited thereto. Alternatively, parts of IP addresses (e.g., the first 2 or 3 octets of the IP addresses) are used as inputs to the first HH encoder 204 (e.g., for training the heavy-hitter IP address encodings and/or during the execution phase when the first HH encoder 204 maps IP addresses or IP address parts to respective heavy-hitter encodings).

Second HH Encoder 206

As described above, the second HH encoder 206 encodes a port number (e.g., TCP port number) into an encoded port number using heavy-hitter encoding. A port is a logical construct that identifies a specific process or a type of network service. Ports are identified for each protocol and address combination by 16-bit unsigned numbers, commonly known as the port number. The most common protocols that use port numbers are the TCP and the UDP.

A port number is always associated with an IP address of a host and the protocol type of the communication. It completes the destination or origination network address of a message. Specific port numbers are commonly reserved to identify specific services, so that an arriving packet can be easily forwarded to a running application. For this purpose, the lowest numbered 1024 port numbers identify the historically most commonly used services and are referred to as the "well-known port numbers." Higher-numbered ports are available for general use by applications and are known as "ephemeral ports."

A consequence of the port allocation is that two adjacent port numbers can have very different flow characteristics in terms of, for example, flow duration, traffic volume, packet size, and inter-arrival time statistics. For that reason, the port numbers are treated as categorical features when used as inputs to the traffic type predictor 202. Also, many unofficial uses of both well-known and registered port numbers occur in practice, which makes it logical to treat port numbers in conjunction with IP addresses or IP address ranges.

The second HH encoder 206 uses an encoding scheme similar to that shown above for the first HH encoder 204 but where the port numbers from the TCP/UDP headers of the packets are encoded using a heavy-hitter scheme rather than the IP addresses. Thus, for example, the 16-bit unsigned port number space is effectively divided into one or more trees (e.g., a first tree starting with 0* at the root node, followed by leaf nodes 00* and 01*, and so on and a second tree starting with 1* at the root node, followed by leaf nodes 10* and 11*, and so on). Using the training dataset, heavy-hitter port numbers and heavy-hitter port number wildcards (e.g., 1011*) are identified based on a predefined or preconfigured threshold φ in the same manner as described above for IP addresses with respect to the first HH encoder 204. In this manner, a mapping between heavy-hitters and categories (and thus one-shot values) is generated and then used for HH encoding of the port numbers of packets received for traffic flows during the execution phase of the traffic flow predictor 200.

Gaussian Mixtures

As discussed above, one or more of the predicted output parameters of the traffic flow predictor 200 are represented as Gaussian mixtures that indicate both the predicted value and an uncertainty of the prediction.

Neural networks are often trained using cross entropy loss for classification problems and Mean Squared Error (MSE) for regression problems. This results in only point estimates of the predicted parameters and reveals no information about the accuracy of the predicted values. Models trained for classification often output a probability distribution over classes, but these probabilities are typically not calibrated to give correct accuracy estimates and, when used with modern neural network architectures, tend to be extremely over-confident in their predictions.

A Mixture Density Network (MDN) output for a predicted parameter, instead of a point estimate for the predicted parameter, provides a whole probability distribution over the predicted parameter. This distribution is parametrized by a Gaussian Mixture Model (GMM) where the parameters are the outputs from a neural network. These parameters are $\alpha$, which is the mixing coefficient for a Gaussian component, as well as the mean ($\mu$) and the standard deviation ($\sigma$) for the Gaussian component. The total probability distribution is given by:

$$p(y|x) = \sum_{n=0}^{N-1} \alpha_n(x) f(y|\mu_n(x), \sigma_n(x)),$$

where $f(y|\mu, \sigma)$ is the Gaussian probability density function, defined as:

$$f(y|\mu, \sigma) = \frac{1}{\sqrt{2\pi\sigma^2}} e^{-\frac{(y-\mu)^2}{2\sigma^2}}.$$

Figure 4:
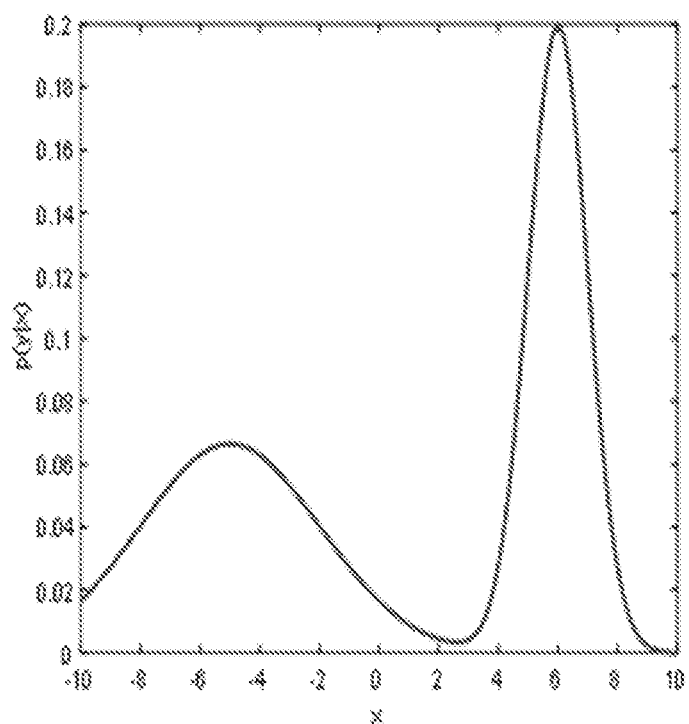
FIG. 4 illustrates an example of a Gaussian mixture with two components.

Note that $\alpha$, $\mu$, and $\sigma$ are vectors, and the number of elements in each vector is the number of mixture components (see, e.g., FIG. 4).

FIG. 4 illustrates an example of a Gaussian mixture with two components. In this example, the components have the parameters $\alpha=[0.5, 0.5]$, $\mu=[-5, 6]$ and $\sigma=[3, 1]$. It should be noted that this requires that the mixing coefficients sum up to one for it to be a valid probability distribution. This can be achieved by normalizing the outputs for the mixing coefficients using a softmax function, defined as:

$$\alpha_n = \frac{\exp(a_n^\alpha)}{\sum_{k=0}^{N-1} \exp(a_k^\alpha)}$$

By minimizing the loss function $$L(x, y) = -\log \sum_{n=0}^{N-1} \alpha_n(x) f(y|\mu_n(x), \sigma_n(x))$$

a neural network can be trained to output the parameters of the Gaussian mixture that best fits the data. Here, x is the input data to the neural network and y is the expected result (i.e., targets).

Thus, in some embodiments, one or more of the predicted parameters of the traffic flow predictor 200 are represented as Gaussian mixtures. For example, the predicted duration output by the traffic type predictor 202 may be represented as a Gaussian mixture via respective parameters α, μ, and σ for the Gaussian. In other words, the traffic type predictor 202, which may be implemented as a neural network, maps the input parameter(s) (encoded IP address, optional encoded port number, and optional channel quality and/or cell load) to parameters α, μ, and σ for the Gaussian mixture model. The Gaussian mixture is trained by minimizing the loss function described above. Note that, at training time, a target value (y) is obtained, and the model parameters are adjusted in such a way that the probability density for the target value is increased. This would be the equation above for L(x, y). Similar predicted output values may be provided for each of the other predicted parameters (e.g., predicted downlink volume, predicted uplink volume, next packet arrival time, next packet size, and/or next packet direction). One example motivation for predicting the full probability density function is that the same prediction can be used for different purposes. For example, if one radio network feature (e.g., carrier aggregation) would degrade performance if enabled for a short-lived flow but another feature would give a large gain for high volume flows but cost a little for small flows, different thresholds can be used for different features that would take such behavior into account.

Traffic Type Predictor 202

As discussed below, during a training phase, the traffic type predictor 202 trains a model (e.g., a neural network) based on a dataset. The dataset is generated from actual traffic flows in the RAN. In general, the dataset includes data needed to train the model used by the traffic type predictor 202, as discussed below in detail. Once trained, the traffic type predictor 202 maps the input parameter(s) (i.e., encoded IP address, optionally encoded port value, optionally channel quality, and optionally cell load) to the output parameter (s) (i.e., predicted traffic flow duration, predicted uplink volume for the traffic flow, and/or predicted downlink volume for the traffic flow).

In addition, in embodiments in which the traffic flow predictor 200 includes the packet predictor 208, the traffic type predictor 202 also outputs a context for the sequence model 210. This context is used as an initial value to condition the sequence model 210 on the predicted type of traffic. This means that if, for example, the server IP address and server port number that were input to the traffic flow predictor 200 corresponds to a YouTube server, the context output by the traffic type predictor 202 should be something that corresponds to "streaming video". The sequence model 210 takes the context together with the arrival time, size, and direction of the initial packet, and outputs a prediction for the second packet in terms of arrival time, size, and direction.

Packet Predictor 208 and Sequence Model 210

There are numerous machine learning models that are designed to work well for temporal sequences. One of the first ones in this class of models was the Recurrent Neural Network (RNN). This type of model uses an internal state to process sequences of input samples. Training is done using an algorithm called Back Propagation Through Time (BPTT) where the recurrent structure of the neural network is unrolled in time over a finite number of time steps. Back propagation can then be used for any feed forward neural network.

However, RNNs can exhibit problems when it comes to learning dependencies over many time steps. This is mainly due to a phenomenon called vanishing gradients, where the gradients during BPTT become very small after a number of time steps. The Long Short-Term Memory (LSTM) model solves this problem. A common LSTM unit is composed of a cell, an input gate, an output gate, and a forget gate. The cell remembers values over arbitrary time intervals, and the three gates regulate the flow of information into and out of the cell.

In recent years a new type of sequence model called "Transformer" has shown very good results on sequential data, and primarily Natural Language Processing (NLP). Transformers can learn long-range dependencies without vanishing or exploding gradients and are amendable to parallelization and can therefore be scaled to larger datasets.

The transformer consists of two main components: (1) a set of encoders chained together and (2) a set of decoders chained together. The function of each encoder is to process its input vectors to generate what are known as encodings, which contain information about the parts of the inputs which are relevant to each other. It passes its set of generated encodings to the next encoder as inputs. Each decoder does the opposite, taking all the encodings and processing them, using their incorporated contextual information to generate an output sequence. To achieve this, each encoder and decoder makes use of an attention mechanism, which, for each input, weighs the relevance of every input and draws information from them accordingly when producing the output. Each decoder also has an additional attention mechanism which draws information from the outputs of previous decoders before the decoder draws information from the encodings. Both the encoders and decoders have a final feed-forward neural network for additional processing of the outputs.

Against this backdrop, the optional packet predictor 208 uses a sequence model 210 to predict one or more packet related parameters (e.g., arrival time of the next packet, size of the next packet, and/or direction of the next packet) for a traffic flow. More specifically, the context output from the traffic type predictor 202 is used as an initial value to condition the sequence model 210 on the predicted type of traffic. The sequence model 210 takes the context together with the arrival time, size, and/or direction of the initial packet, and outputs a prediction for the second packet in terms of arrival time, size, and/or direction. The sequence model continues in this manner to make predictions for the third packet, the fourth packet, and so on.

Training Phase

Figure 5:
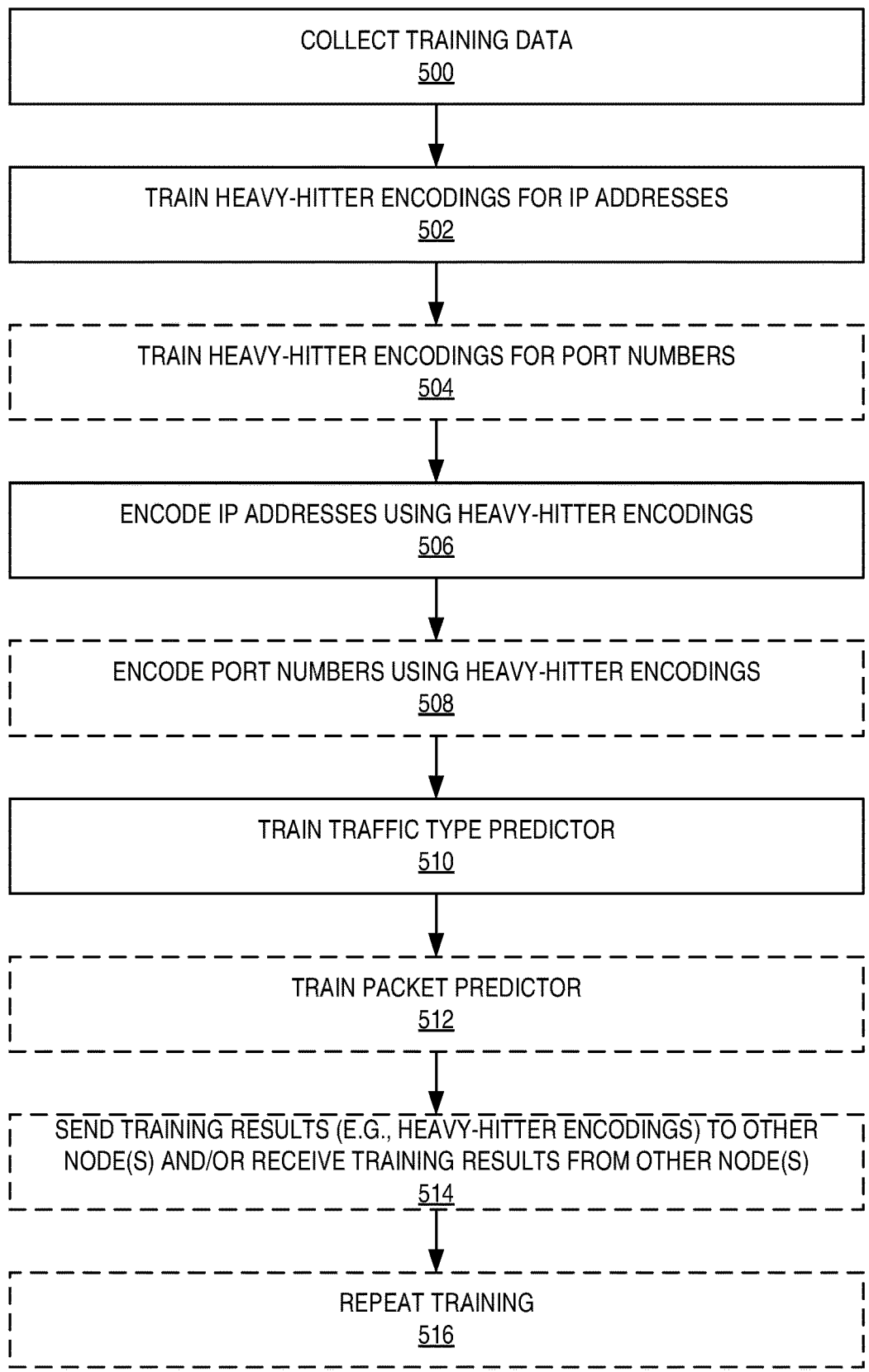
FIG. 5 is a flow chart that illustrates a training procedure for a traffic flow predictor in accordance with embodiments of the present disclosure.

In the following description, descriptions of embodiments for training the traffic flow predictor 200 are provided. In this regard, FIG. 5 is a flow chart that illustrates a process performed by a processing node (e.g., a base station 102) to train the traffic flow predictor 200 in accordance with embodiments of the present disclosure. Optional steps are represented by dashed lines/boxes. As illustrated, the processing node collects training data, i.e. a dataset (step 500). Note that this training process may be performed offline, in which case the dataset is a collection of data for past traffic flows in the RAN or in a particular cell(s) of the RAN. The training process may alternatively be performed online, in which case the dataset is a collection of data for current traffic flows in the RAN or in a particular cell(s) of the RAN. As discussed above, the training data includes:
  input feature data:
    a for training the traffic type predictor 202:

IP addresses (e.g., server IP addresses) (or parts of IP addresses) extracted from a number of packets for a number of traffic flows;
> Note that, for downlink traffic, the source IP address is the server IP address. Conversely, for uplink traffic, the destination IP address is the server IP address. This assumes that clients are generally located on the UE side and servers are located on the network side. In the rare cases when this is not true (e.g., when a UE runs a web server), the uncertainty in the predictions will be larger.

optionally port numbers (e.g., server port numbers) extracted from a number of packets for a number of traffic flows;
> Note that, for downlink traffic, the port number associated with the source IP address is the server port number. Conversely, for uplink traffic, the port number associated with the destination IP address is the server port number. Again, this assumes that clients are generally located on the UE side and servers are located on the network side. In the rare cases when this is not true (e.g., when a UE runs a web server), the uncertainty in the predictions will be larger.

optionally channel quality values associated with the traffic flows;
> Note that channel quality is represented by, e.g., a Reference Signal Received Power (RSRP) and/or Signal to Interference plus Noise Ratio (SINR) and/or Reference Signal Received Quality (RSRQ) measured by a UE on a specific reference signal. For example, the Cell-specific Reference Signal (CRS) of the serving cell and up to eight neighboring cells in LTE context can be used. RSRP values can, in the context of NR, be reported by UE measurement on the Synchronization Signal Block (SSB) or Channel State Information Reference Signal (CSI-RS).

optionally cell load value associated with the traffic flows;
> The cell load comprises, for example, the number of connected UEs in each cell, the percentage of the used time-frequency resources in each cell, or the like.

for training the packet predictor 208 and, more specifically, the sequence model 210:
information about packets in the traffic flows such as, e.g., packet arrive times, packet sizes, and packet directions (i.e., uplink or downlink);

prediction target data:
for training the traffic type predictor 202:
durations of the traffic flows;
optionally downlink volume of the traffic flows;
optionally uplink volume of the traffic flows; and
for training the packet predictor 208:
the same information about packets in the traffic flows such as, e.g., packet arrive times, packet sizes, and packet directions (i.e., uplink or downlink) as mentioned above is used to train the sequence model to predict information about the next packet based on information about the current packet.

The processing node uses the IP addresses (or parts of the IP addresses) from the training data to train the heavy-hitter encodings for the first HH encoder 204 (step 502). This training can be performed by counting the number of hits (i.e., matches) for IP addresses or IP address wildcards that occur in the training data and determining which IP addresses or IP address wildcards occur at least a threshold number of times. In other words, as described above, given a threshold $\varphi$, the heavy-hitter IP addresses or IP address wildcards are those with frequency in the training data of at least $\varphi N$, where N is the size of the training data with respect to IP addresses (i.e., the total number of IP addresses in the data set being analyzed to training the heavy-hitter encodings). The heavy-hitter parameter $\varphi$ could be set based on the hardware constraints on the processing node. For instance, a processing node with large memory and computational powers could use a lower $\varphi$ in comparison to a processing node with less advanced hardware. Note that approximate streaming versions of the procedure for training the heavy-hitter encodings are available as well.

Optionally, the processing node uses the port numbers from the training data to train the heavy-hitter encodings for the second HH encoder 206 (step 504). This training can be performed by identifying port numbers or port number wildcards that occur in the training data at least a threshold number of times. In other words, as described above, given a threshold $\varphi$, the heavy-hitter port numbers or port number wildcards are those with frequency in the training data of at least $\varphi N$, where N is the size of the training data with respect to port numbers (i.e., the total number of port numbers in the data set being analyzed to training the heavy-hitter encodings). Note that the threshold $\varphi$ for port numbers may be the same as or different than the threshold $\varphi$ for IP addresses.

The processing node encodes the IP addresses (or the parts of the IP addresses) in the training data using the heavy-hitter encodings determined in step 502 for the first HH encoder 204 (step 506). For example, for each IP address, the first HH encoder 204 determines whether the IP address is a heavy-hitter IP address. If so, the IP address is mapped to the encoded value for that heavy-hitter IP address. Otherwise, the first HH encoder 204 determines the heavy-hitter IP address wildcard for which the IP address falls within the respective range of IP addresses and maps the IP address to the encoded value for that heavy-hitter IP address wildcard. For example, the determined heavy-hitter IP address wildcard may be the heavy-hitter IP address wildcard card that corresponds to the smallest range of IP addresses within which the IP address falls. Optionally, the processing node encodes the port numbers in the training data using the heavy-hitter encodings determined in step 504 for the second HH encoder 206 in a similar manner (step 508).

The processing node trains the traffic type predictor 202 (e.g., the neural network or machine learning model of the traffic type predictor 202) based on the encoded IP addresses from step 506, optionally the encoded port numbers from step 508, optionally one or more link quality related parameters (e.g., channel quality and/or cell load) for the respective traffic flows from the training data, the duration values for the traffic flows from the training data, optionally the uplink volume values for the traffic flows from the training data, and optionally the downlink volume values for the traffic flows from the training data (step 510). As discussed above, in some embodiments, the output parameter(s) of the traffic type predictor 202 may be represented as a Gaussian mixture(s), in which case the parameters of the Gaussian mixture(s) are trained using the aforementioned data.

Optionally, the processing node trains the packet predictor 208 (i.e., the sequence model 210) using the training data (step 512). In particular, the processing node trains the sequence model 210 using information about the packets of the traffic flows (e.g., arrival times, sizes, and/or direction) comprised in the training data. For instance, for each category of traffic, the processing node uses the information about the packets of the traffic flows mapped to that category to training the sequence model 210 for that category. As discussed above, in some embodiments, the output parameter(s) of the traffic type predictor 202 may be represented as a Gaussian mixture(s), in which case the parameters of the Gaussian mixture(s) are trained using the aforementioned data.

Numerous training schemes for training a neural network or machine learning model are known to those of skill in the art. Such training schemes may be used to train the traffic type predictor 202 and optionally the packet predictor 208 (i.e., the sequence model 210). For example, training schemes such as stochastic gradient decent may be used. For continuous targets (predicted output parameters) like flow duration, downlink volume, uplink volume, packet arrive time, and packet size, the loss can be the MSE between the predicted quantities and the measured ones. For categorical targets (e.g., packet direction), the loss can be the cross-entropy loss.

The training could be performed after the processing node has collected more than a threshold number of measurements or when the processing node has gathered more than M measurements for N IP headers.

Optionally, in some embodiments, training may be distributed. For example, each base station 102 may perform its own training and share training results (e.g., heavy-hitter encodings for IP addresses and optionally heavy-hitter encodings for port numbers) with other base stations 102. In this regard, the processing node may send its training results to one or more other processing nodes and/or receive training results from one or more other processing nodes (step 514). If training results are received from another processing node(s), the processing node updates its training results accordingly (e.g., updating its heavy-hitter encodings).

Optionally, the processing node repeats the training procedure (step 516). For example, the training may be repeated or updated periodically or when performance of the traffic flow predictor 200 falls below some predefined or preconfigured threshold.

Execution Phase

Figure 6:
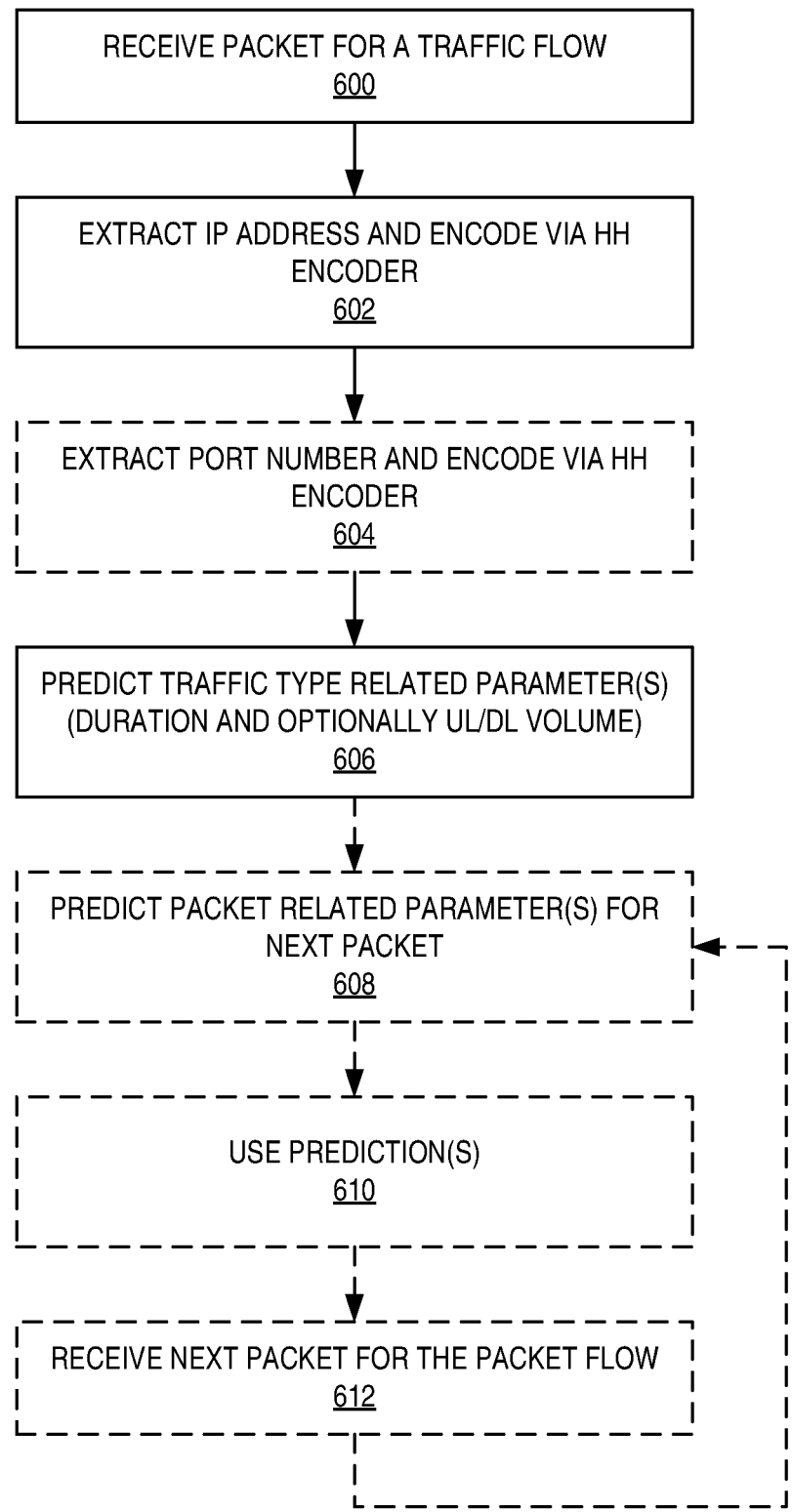
FIG. 6 is a flow chart that illustrates an execution procedure for a traffic flow predictor in accordance with embodiments of the present disclosure.

In the following description, descriptions of embodiments for using the trained traffic flow predictor 200 are provided. In this regard, FIG. 6 illustrates the operation of the traffic flow predictor 200 during the execution phase in accordance with some embodiments the present disclosure. Optional steps are represented with dashed lines/boxes. The traffic flow predictor 200 may be implemented at a processing node such as, for example, a radio access node, e.g., a base station 102. As illustrated, the traffic flow predictor 200 receives a packet for a traffic flow (step 600). The traffic flow predictor 200 extracts the IP address (e.g., server IP address) (or part of the IP address) from the IP header of the received packet and encodes the extracted IP address (or the extracted part of the IP address) using the first HH encoder 204 (step 602). Optionally, the traffic flow predictor 200 extracts the port number (e.g., server port number) from the header (e.g., TCP or UDP header) of the received packet and encodes the extracted port number using the second HH encoder 206 (step 604).

The traffic flow predictor 200, and more specifically the traffic type predictor 202, predicts one or more traffic type related parameters (i.e., a duration of the traffic flow and optionally uplink and/or downlink volume for the traffic flow) based on the encoded IP address, optionally the encoded port number, and optionally one or more associated link quality related parameters (e.g., channel quality and/or cell load), as described above (step 606).

Optionally, the traffic flow predictor 200, and more specifically the packet predictor 208, predicts one or more packet related parameters (e.g., next packet arrival time, next packet size, and/or next packet direction) based on an initial context provided by the traffic type predictor 202 and one or more current packet related parameters (e.g., current packet arrival time, current packet size, and/or current packet direction), as described above (step 608).

Optionally, the predictions (i.e., the predicted traffic type related parameter(s) and optionally the predicted packet related parameter(s) for the next packet for the traffic flow) are used to perform one or more actions (step 610). For example, these predictions may be used to determine whether to activate or deactivate carrier aggregation for the traffic flow, determine whether to perform inter-frequency handover of the associated UE 112, determine whether to perform uplink pre-scheduling for the traffic flow, determine an amount of uplink resources and/or a timing of those uplink resources to be pre-scheduled for the traffic flow, and/or perform one or more admission control related actions.

As part of the packet prediction, a next packet is received (step 612), and the packet predictor 208 then uses information for that packet to then predict parameters(s) for the next packet (step 608), and so on.

Additional Description

Numerous embodiments are disclosed in herein. In one embodiment, the traffic flow predictor 200 predicts traffic flow statistics (e.g., flow duration, uplink volume, and/or downlink volume) using information from the IP header (e.g., server side IP address) and potentially also information from the TCP/UDP header (e.g., server side TCP port) of a packet (e.g., the first packet) in the traffic flow. In one embodiment, the IP address is encoded using a heavy-hitter encoding, as described above.

In one embodiment, the traffic flow predictor 200 also outputs uncertainties of the estimated quantities, where uncertainties are expressed as a Gaussian mixture.

In one embodiment, the traffic flow predictor 200 also predicts one or more packet related parameters such as, e.g., the arrival times, sizes, and/or directions of individual packets in the traffic flow. This prediction is performed using a sequence model that is initialized with a context from the traffic type predictor 202. This context is provided after prediction for the first packet in the traffic flow.

In one embodiment, the traffic flow predictor 200 (including the heavy-hitter encoding(s)) is trained offline using traffic flow data collected from a large geographical area over an extended period of time. These training results are then distributed in the network and used for traffic prediction (e.g., used by separate traffic flow predictors 200 at multiple base stations 102 in the network).

In another embodiment, the traffic flow predictor 200 is trained offline but fine-tuned periodically as the traffic distribution changes.

In another embodiment, a prediction error on unseen traffic flows is monitored and automatic fine-tuning of the traffic flow predictor 200 is triggered when the error becomes too high (e.g., above a predefined or preconfigured threshold that defines the maximum acceptable error).

In another embodiment, the (re-)training of the traffic flow predictor 200 is done in a distributed way, and training results (e.g., learning models or neural network parameters and/or heavy-hitter encodings) from different parts of the network are merged in a central location and then redistributed to the network nodes that perform predictions.

Figure 7:
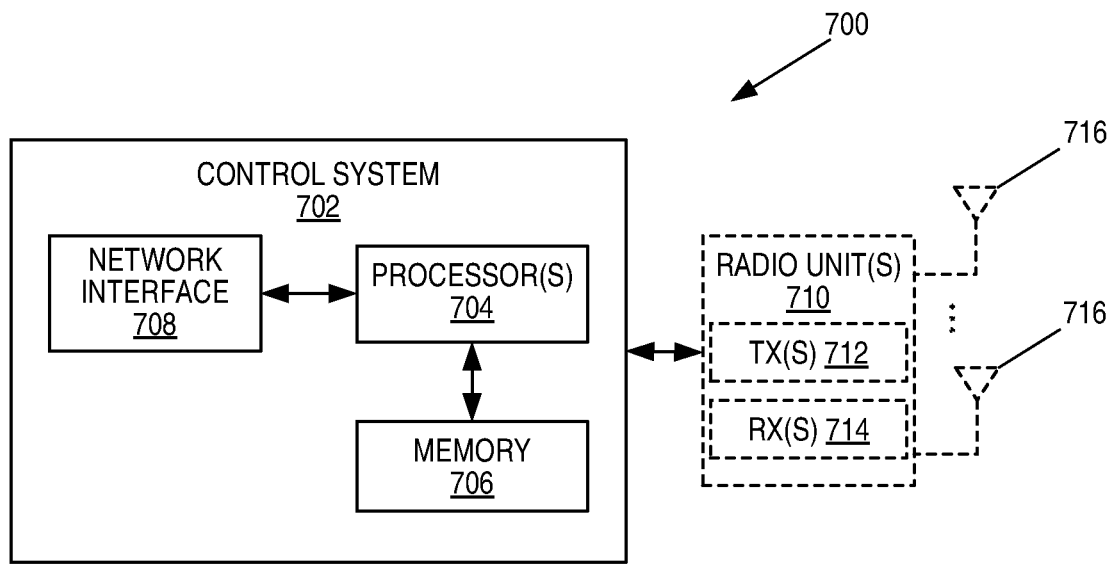
FIG. 7 is a schematic block diagram of a processing node according to some embodiments of the present disclosure.

FIG. 7 is a schematic block diagram of a processing node 700 according to some embodiments of the present disclosure. Optional features are represented by dashed boxes. The processing node 700 may be, for example, a base station 102 or a network node that implements all or part of the functionality of the base station 102 described herein. Alternatively, the processing node 700 may be another node in the RAN or a node that is external to the RAN. It should also be noted that the processing node that performs the training procedure of FIG. 5 may be the same processing node that performs the prediction procedure of FIG. 6 or a different processing node than the processing node that performs the prediction procedure of FIG. 6. As illustrated, the processing node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry. In addition, in embodiments in which the processing node 700 is a radio access node (e.g., a base station 102), the processing node 700 may include one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of the processing node 700 as described herein (e.g., one or more functions of the traffic flow predictor 200, one or more functions of a processing node that performs the training procedure of FIG. 5, and/or one or more functions of a processing node that performs the prediction procedure of FIG. 6). In some embodiments, the function(s) are implemented in software that is stored, e.g., in the memory 706 and executed by the one or more processors 704.

Figure 8:
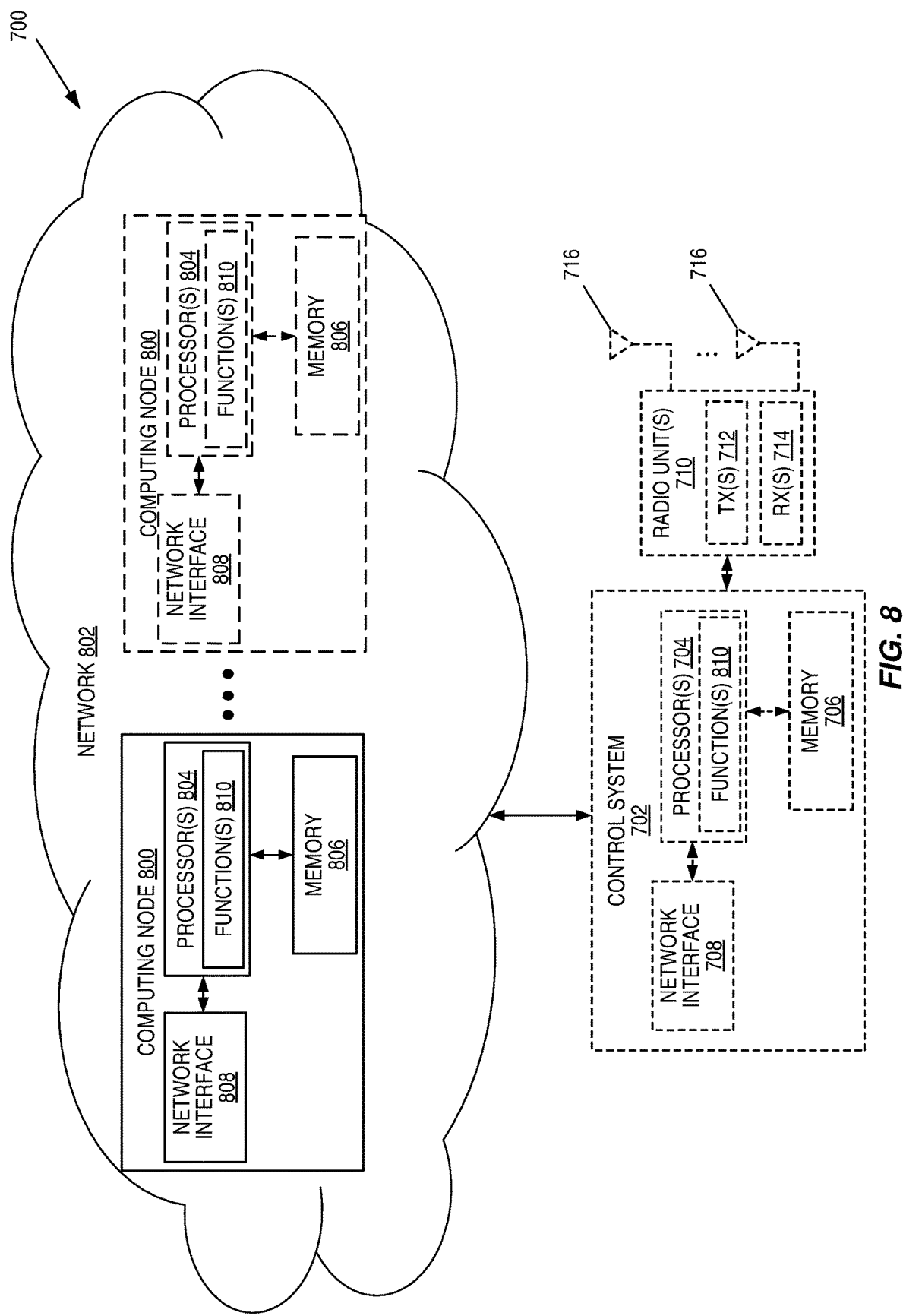
FIG. 8 is a schematic block diagram that illustrates a virtualized embodiment of the processing node of FIG. 7 according to some embodiments of the present disclosure.

FIG. 8 is a schematic block diagram that illustrates a virtualized embodiment of the processing node 700 according to some embodiments of the present disclosure. As used herein, a "virtualized" processing node is an implementation of the processing node 700 in which at least a portion of the functionality of the processing node 700 is implemented as a virtual component(s) (e.g., via a virtual machine(s) executing on a physical processing node(s) in a network(s)). As illustrated, in this example, the processing node 700 includes one or more computing nodes 800 coupled to or included as part of a network(s) 802. Each computing node 800 includes one or more processors 804 (e.g., CPUs, ASICs, FPGAs, and/or the like), memory 806, and a network interface 808. In addition, if the processing node 700 is a radio access node 700, the processing node 700 may also include the control system 702 and/or the one or more radio units 710, as described above. If present, the control system 702 or the radio unit(s) are connected to the computing node(s) 800 via the network 802.

In this example, functions 810 of the processing node 700 described herein (e.g., one or more functions of the traffic flow predictor 200, one or more functions of a processing node that performs the training procedure of FIG. 5, and/or one or more functions of a processing node that performs the prediction procedure of FIG. 6) are implemented at the one or more computing nodes 800 or distributed across the one or more computing nodes 800 and the control system 702 and/or the radio unit(s) 710 in any desired manner. In some particular embodiments, some or all of the functions 810 of the processing node 700 described herein are implemented as virtual components executed by one or more virtual machines implemented in a virtual environment(s) hosted by the computing node(s) 800. As will be appreciated by one of ordinary skill in the art, additional signaling or communication between the computing node(s) 800 and the control system 702 is used in order to carry out at least some of the desired functions 810. Notably, in some embodiments, the control system 702 may not be included, in which case the radio unit(s) 710 communicate directly with the computing node(s) 800 via an appropriate network interface(s).

In some embodiments, a computer program including instructions which, when executed by at least one processor, causes the at least one processor to carry out the functionality of the processing node 700 or a node (e.g., a computing node 800) implementing one or more of the functions 810 of the processing node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
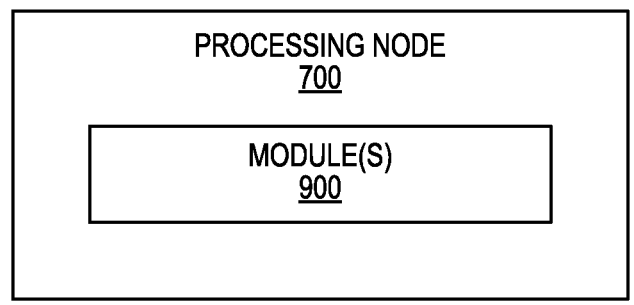
FIG. 9 is a schematic block diagram of the processing node of FIG. 7 according to some other embodiments of the present disclosure.

FIG. 9 is a schematic block diagram of the processing node 700 according to some other embodiments of the present disclosure. The processing node 700 includes one or more modules 900, each of which is implemented in software. The module(s) 900 provide the functionality of the processing node 700 described herein (e.g., one or more functions of the traffic flow predictor 200, one or more functions of a processing node that performs the training procedure of FIG. 5, and/or one or more functions of a processing node that performs the prediction procedure of FIG. 6). This discussion is equally applicable to the computing node 800 of FIG. 8 where the modules 900 may be implemented at one of the computing nodes 800 or distributed across multiple computing nodes 800 and/or distributed across the computing node(s) 800 and the control system 702.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

- 3GPP Third Generation Partnership Project
- 5G Fifth Generation
- 5GC Fifth Generation Core
- 5GS Fifth Generation System
- AMF Access and Mobility Function
- ASIC Application Specific Integrated Circuit
- AUSF Authentication Server Function
- BPTT Back Propagation Through Time
- CPU Central Processing Unit
- CRS Cell-Specific Reference Signal
- CSI-RS Channel State Information Reference Signal
- DPI Deep Packet Inspection
- DSP Digital Signal Processor
- eNB Enhanced or Evolved Node B
- EPC Evolved Packet Core
- EPS Evolved Packet System
- E-UTRAN Evolved Universal Terrestrial Radio Access Network
- FPGA Field Programmable Gate Array
- GBR Guaranteed Bitrate
- GMM Gaussian Mixture Model
- gNB New Radio Base Station
- gNB-DU New Radio Base Station Distributed Unit
- HH Heavy-Hitter
- HSS Home Subscriber Server
- HTTP Hypertext Transfer Protocol
- IoT Internet of Things
- IP Internet Protocol
- IPv4 Internet Protocol Version 4
- IPv6 Internet Protocol Version 6
- LSTM Long Short-Term Memory
- LTE Long Term Evolution
- MDN Mixture Density Network
- MME Mobility Management Entity
- MSE Mean Squared Error
- MTC Machine Type Communication
- NEF Network Exposure Function
- NF Network Function
- ng-eNB Next Generation Enhanced or Evolved Node B
- NG-RAN Next Generation Radio Access Network
- NLP Natural Language Processing
- NR New Radio
- NRF Network Function Repository Function
- NSSF Network Slice Selection Function
- PC Personal Computer
- PCF Policy Control Function
- PDP Packet Data Protocol
- P-GW Packet Data Network Gateway
- QCI Quality of Service Class Identifier
- QoS Quality of Service
- RAM Random Access Memory
- RAN Radio Access Network
- RLC Radio Link Control
- RNN Recurrent Neural Network
- ROM Read Only Memory
- RRC Radio Resource Control
- RRH Remote Radio Head
- RSRP Reference Signal Received Power
- RSRQ Reference Signal Received Quality
- SCEF Service Capability Exposure Function
- SDF Service Data Flow
- S-GW Serving Gateway
- SINR Signal to Interference plus Noise Ratio
- SMF Session Management Function
- SSB Synchronization Signal Block
- TCP Transmission Control Protocol
- TFT Traffic Flow Template
- UDM Unified Data Management
- UDP User Datagram Protocol
- UE User Equipment
- UPF User Plane Function
- VoIP Voice over Internet Protocol Those skilled in the art will recognize improvements and modifications to the embodiments of the present disclosure. All such improvements and modifications are considered within the scope of the concepts disclosed herein.

What is claimed is:

1. A computer-implemented method for traffic flow prediction for a wireless network, the method comprising:
    collecting training data, the training data comprising:
        Internet Protocol (IP) addresses or parts of IP addresses extracted from IP headers of a plurality of packets for a plurality of traffic flows in a wireless network; and
        one or more actual traffic type related parameters for each of the plurality of traffic flows;
    training heavy-hitter IP address encodings based on the IP addresses or the parts of IP addresses extracted from the IP headers of the plurality of packets for the plurality of traffic flows in the wireless network;
    encoding the IP addresses or the parts of IP addresses extracted from the IP headers of the plurality of packets for the plurality of traffic flows using the trained heavy-hitter IP address encodings to thereby provide encoded IP addresses; and
    training a traffic type predictor of a traffic flow predictor based on the encoded IP addresses and the one or more actual traffic type related parameters for each of the plurality of traffic flows, the traffic type predictor being a learning model that maps encoded IP addresses to one or more predicted traffic type related parameters.

2. The computer-implemented method of claim 1, wherein the IP addresses or the parts of IP addresses are source IP addresses or parts of source IP addresses for downlink packets and destination IP addresses or parts of destination IP addresses for uplink packets.

3. The computer-implemented method of claim 1, wherein:
    the one or more actual traffic type related parameters comprise, for each traffic flow of the plurality of traffic flows, an actual duration of the traffic flow; and
    the one or more predicted traffic type related parameters comprise a predicted duration of a respective traffic flow for which prediction is performed.

4. The computer-implemented method of claim 1, wherein:
    the training data comprises the IP addresses extracted from IP headers of the plurality of packets for the plurality of traffic flows in the wireless network;

training the heavy-hitter encodings comprises training the heavy-hitter encodings based on the IP addresses extracted from IP headers of the plurality of packets for the plurality of traffic flows in the wireless network;

encoding the IP addresses or the parts of IP addresses comprises encoding the IP addresses extracted from IP headers of the plurality of packets for the plurality of traffic flows in the wireless network based on the heavy-hitter encodings.

5. The computer-implemented method of claim 4, wherein the heavy-hitter IP address encodings comprise mappings of a plurality of heavy-hitter IP addresses to respective one-hot encodings, wherein:

each heavy-hitter IP address of the plurality of heavy-hitter IP addresses is an IP address that occurs at least a predefined or preconfigured amount of times in the training data; and each one-hot encoding is a mapping of a respective heavy-hitter IP address to a particular one-hot value, the one-hot value being a bit sequence in which only one bit is set to a first binary value and all other bits in the bit sequence are set to a second binary value that is different than the first binary value.

6. The computer-implemented method of claim 4, wherein the heavy-hitter IP address encodings comprise mappings of a plurality of heavy-hitter IP address ranges to respective one-hot encodings, wherein each heavy-hitter IP address range of the plurality of heavy-hitter IP address ranges is an IP address range for which IP addresses that match the IP address range occur at least a predefined or preconfigured amount of times in the training data.

7. The computer-implemented method of claim 1, wherein:

the training data further comprises port numbers extracted from Transmission Control Protocol (TCP) or User Datagram Protocol (UDP) headers of the plurality of packets for the plurality of traffic flows in the wireless network; and the method further comprises:

training heavy-hitter port number encodings based on the port numbers extracted from the TCP or UDP headers of the plurality of packets for the plurality of traffic flows in the wireless network; and encoding the port numbers extracted from the TCP or UDP headers of the plurality of packets for the plurality of traffic flows using the trained heavy-hitter port number encodings;

wherein training the traffic type predictor comprises training the traffic type predictor based on the encoded IP addresses, the encoded port numbers, and the one or more actual traffic type related parameters for each of the plurality of traffic flows, the traffic type predictor being a learning model that maps encoded IP addresses and encoded port numbers to one or more predicted traffic type related parameters.

8. The computer-implemented method of claim 7, wherein the port numbers are port numbers associated with source IP addresses for downlink packets and port numbers associated with destination IP addresses for uplink packets.

9. The computer-implemented method of claim 7, wherein the heavy-hitter port number encodings comprise mappings of a plurality of heavy-hitter port numbers to respective one-hot encodings, wherein each heavy-hitter port number of the plurality of heavy-hitter port numbers is a port number that occurs at least a predefined or preconfigured amount of times in the training data.

10. The computer-implemented method of claim 7, wherein the heavy-hitter port number encodings comprise mappings of a plurality of heavy-hitter port number ranges to respective one-hot encodings, wherein each heavy-hitter port number range of the plurality of heavy-hitter port number ranges is a port number range for which port numbers that match the port number range occur at least a predefined or preconfigured amount of times in the training data.

11. The computer-implemented method of claim 1, wherein:

the training data further comprises one or more link quality related parameters for each of the plurality of traffic flows in the wireless network; and training the traffic type predictor comprises training the traffic type predictor based on the encoded IP addresses, the one or more actual traffic type related parameters for each of the plurality of traffic flows, and the one or more link quality related parameters for each of the plurality of traffic flows in the wireless network, the traffic type predictor being a learning model that maps encoded IP addresses and the one or more link quality related parameters to one or more predicted traffic type related parameters.

12. The computer-implemented method of claim 11, wherein the one or more link quality related parameters comprise channel quality, cell load, or both channel quality and cell load.

13. The computer-implemented method of claim 1, wherein the training data further comprises one or more packet related parameters for the plurality of packets for the plurality of traffic flows in the wireless network, and the method further comprises:

training a packet predictor of the traffic flow predictor based on, for each traffic flow of the plurality of traffic flows, an initial context for the traffic flow output by the traffic type predictor and the one or more packet related parameters for the traffic flow from the training data, the packet predictor comprising a sequence model for prediction of one or more parameters for a next packet in the traffic flow based on one or more parameters for a current packet in the traffic flow.

14. The computer-implemented method of claim 13, wherein the initial context comprises information that indicates a traffic category of the traffic flow.

15. The computer-implemented method of claim 13, wherein:

the one or more packet related parameters for the plurality of packets for the plurality of traffic flows comprised in the training data comprise: (a) packet arrival time, (b) packet size, (c) packet direction, or (d) a combination of any two or more of (a)-(c); and the sequence model predicts (i) next packet arrival time for a respective traffic flow, (ii) next packet size for the respective traffic flow, (iii) next packet direction for the respective traffic flow, or (iv) a combination of any two or more of (i)-(iii), based on (A) current packet arrival time for the respective traffic flow, (B) current packet size for the respective traffic flow, (C) current packet direction for the respective traffic flow, or (D) a combination of any two or more of (A)-(C).

16. The computer-implemented method of claim 1, wherein, for at least one predicted traffic type related parameter of the one or more predicted traffic type related parameters, the learning model further outputs one or more values that represent an uncertainty of the at least one predicted traffic type related parameter expressed as a Gaussian mixture.

17. The computer-implemented method of claim 1, further comprising providing results of the training of the heavy-hitter IP address encodings and results of the training of the traffic type predictor to one or more other nodes.

18. A processing node for traffic flow prediction for a wireless network, the processing node comprising processing circuitry configured to cause the processing node to:
 collect training data, the training data comprising:
  Internet Protocol (IP) addresses or parts of IP addresses extracted from IP headers of a plurality of packets for a plurality of traffic flows in a wireless network; and
  one or more actual traffic type related parameters for each of the plurality of traffic flows;
 train heavy-hitter IP address encodings based on the IP addresses or parts of IP addresses extracted from the IP headers of the plurality of packets for the plurality of traffic flows in the wireless network;
 encode the IP addresses or parts of IP addresses extracted from the IP headers of the plurality of packets for the plurality of traffic flows using the trained heavy-hitter IP address encodings to thereby provide encoded IP addresses; and
 train a traffic type predictor of a traffic flow predictor based on the encoded IP addresses and the one or more actual traffic type related parameters for each of the plurality of traffic flows, the traffic type predictor being a learning model that maps encoded IP addresses to one or more predicted traffic type related parameters.

19. A computer-implemented method for traffic flow prediction for a wireless network, the method comprising:
 receiving a packet for a particular traffic flow;
 extracting an Internet Protocol (IP) address or part of the IP address from an IP header of the received packet;
 encoding the extracted IP address or the extracted part of the IP address using a first heavy-hitter encoder that maps the extracted IP address or the extracted part of the IP address to an encoded IP address; and
 predicting one or more predicted traffic type related parameters for the particular traffic flow based on the encoded IP address.

20. A processing node for traffic flow prediction for a wireless network, the processing node comprising processing circuitry configured to cause the processing node to:
 receive a packet for a particular traffic flow;
 extract an Internet Protocol (IP) address or a part of the IP address from an IP header of the received packet;
 encode the extracted IP address or the extracted part of the IP address using a first heavy-hitter encoder that maps the extracted IP address or the extracted part of the IP address to an encoded IP address; and
 predict one or more predicted traffic type related parameters for the particular traffic flow based on the encoded IP address.

* * * * *